US010616904B1

(12) United States Patent
Mirkamali et al.

(10) Patent No.: US 10,616,904 B1
(45) Date of Patent: Apr. 7, 2020

(54) INTELLIGENTLY-SWITCHED, CONCURRENTLY-OPERATED OMNIDIRECTIONAL AND DIRECTIONAL ANTENNAS

(71) Applicant: Amazon Technologies, Inc., Seattle, WA (US)

(72) Inventors: Ali Mirkamali, San Jose, CA (US); Tzung-I Lee, San Jose, CA (US); Omar Fawazhashim Zakaria, Santa Clara, CA (US); Kalyan Teja Posani, San Jose, CA (US); In Chul Hyun, Saratoga, CA (US); Cheol Su Kim, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 15/877,038

(22) Filed: Jan. 22, 2018

(51) Int. Cl.
| | | |
|---|---|---|
| *H04W 72/08* | (2009.01) | |
| *H04W 16/28* | (2009.01) | |
| *H04W 72/04* | (2009.01) | |
| *H01Q 1/24* | (2006.01) | |
| *H01Q 1/52* | (2006.01) | |
| *H01Q 21/06* | (2006.01) | |
| *H01Q 1/38* | (2006.01) | |

(52) U.S. Cl.
CPC .......... *H04W 72/085* (2013.01); *H01Q 1/246* (2013.01); *H01Q 1/523* (2013.01); *H01Q 21/062* (2013.01); *H04W 16/28* (2013.01); *H01Q 1/38* (2013.01); *H04W 72/046* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 9,634,403 B2 * | 4/2017 | Shtrom .................. | H01Q 21/28 |
| 10,291,698 B2 * | 5/2019 | Hulick .................... | H01Q 1/243 |
| 2006/0025178 A1 * | 2/2006 | Tao ........................ | H04B 7/0617 455/562.1 |
| 2006/0164318 A1 * | 7/2006 | Lastinger ............... | H01Q 1/246 343/841 |

(Continued)

FOREIGN PATENT DOCUMENTS

WO    WO-2008005800 A2 *   1/2008   ........... H01Q 1/1242

*Primary Examiner* — Lonnie V Sweet
(74) *Attorney, Agent, or Firm* — Lowenstein Sandler LLP

(57) ABSTRACT

A device includes first and second directional antennas, an omnidirectional antenna, and a switch selectively coupled between the first directional and omnidirectional antennas. A first radio includes first RF circuitry. A switch selectively couples the first omnidirectional antenna or the first directional antenna to the first radio. A second radio is coupled to the second directional antenna and includes second RF circuitry. An application processor receives, from first RF circuitry, a first radio frequency performance indicator (RFPI) value for signals received over the omnidirectional antenna, a second RFPI value for signals received over the first directional antenna, and, from the second RF circuitry, a third RPI value for signals received over the second directional antenna. The application processor determines a best RFPI value, selects an antenna corresponding to the best RFPI value, and selects a radio corresponding to the selected antenna.

20 Claims, 17 Drawing Sheets

(56) References Cited

U.S. PATENT DOCUMENTS

2012/0274527 A1* 11/2012 Ayatollahi .............. H01Q 1/38
  343/770
2013/0059625 A1*  3/2013 Clegg ................ H04W 84/105
  455/552.1
2017/0079001 A1*  3/2017 Lewis ................ H04W 64/006

* cited by examiner

Radiation pattern of the vertical dipole array

Radiation pattern of the horizontal dipole array

Radiation pattern of the dipole antenna

Radiation pattern of the monopole antenna

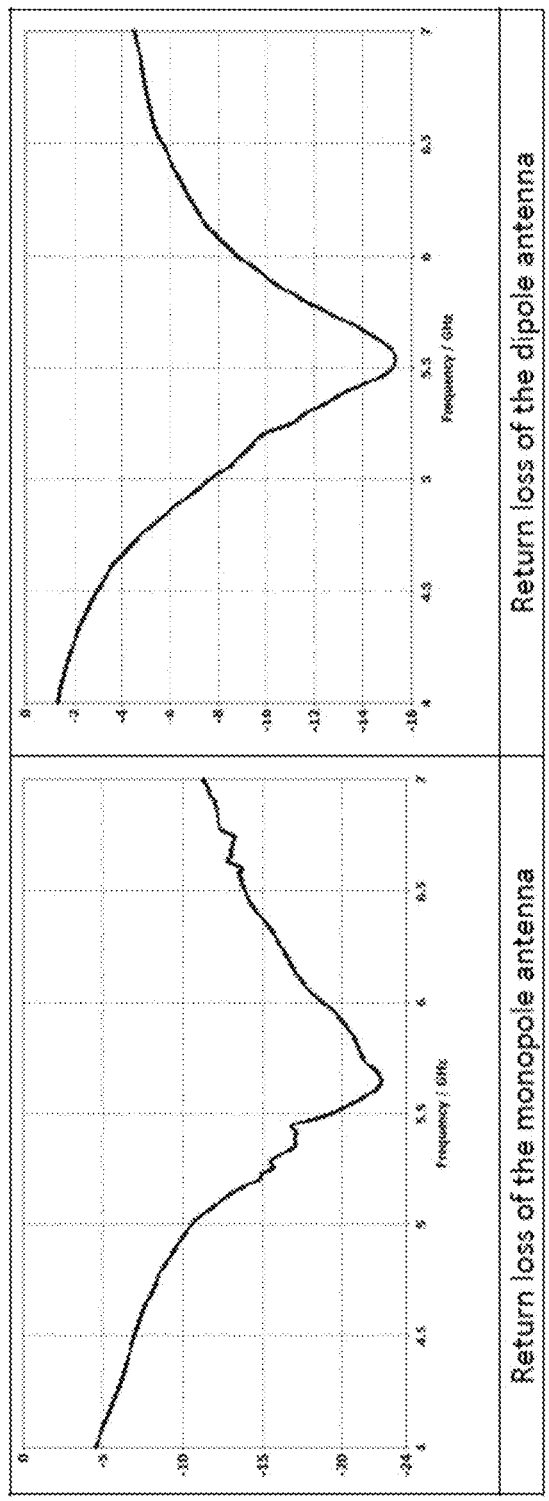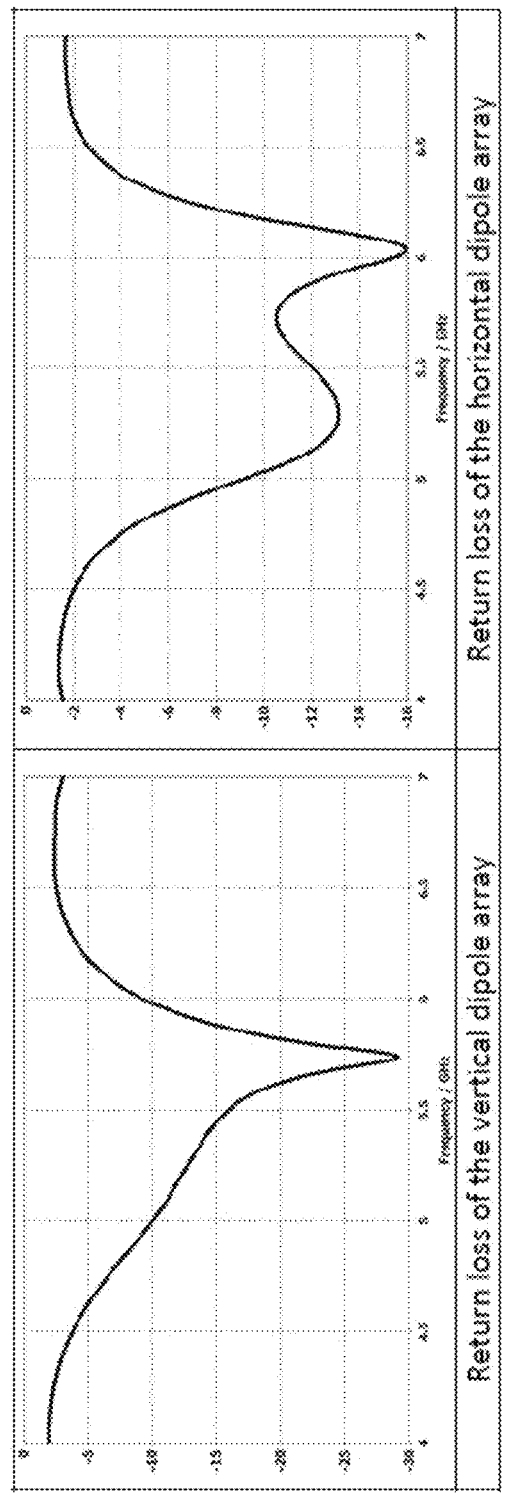
FIG. 5D
FIG. 5B
FIG. 5C
FIG. 5A

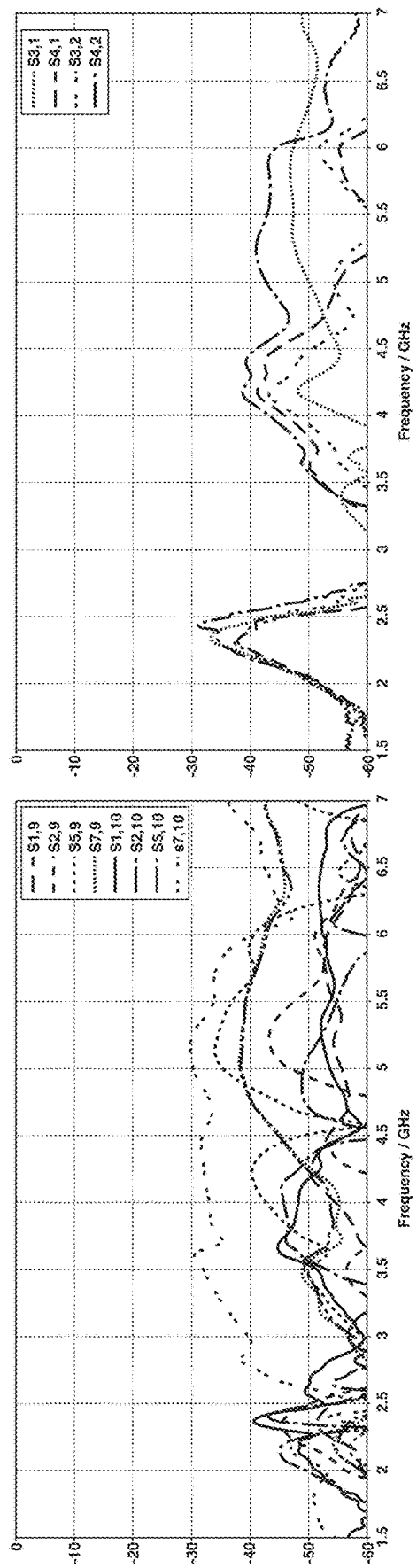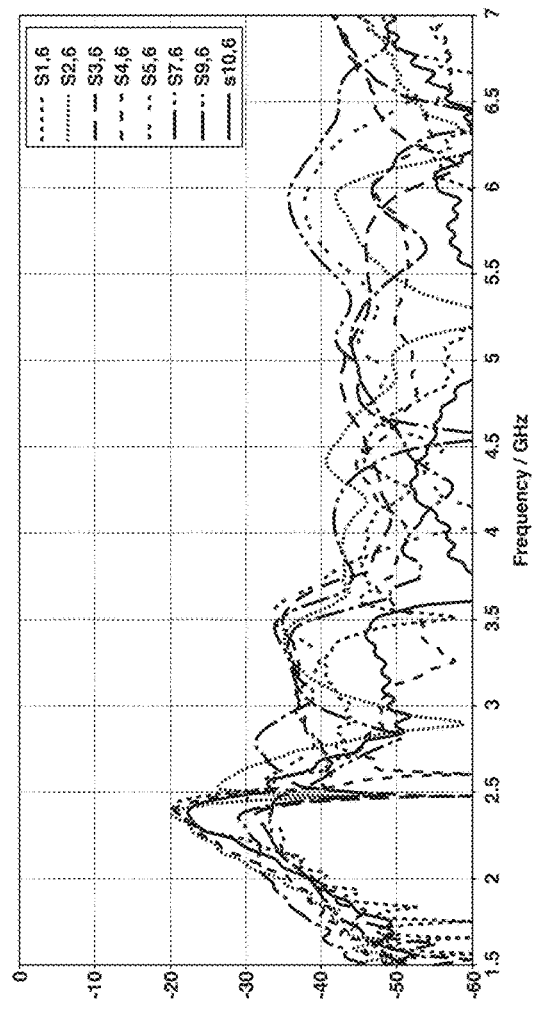
FIG. 14A
FIG. 14B
FIG. 14C

INTELLIGENTLY-SWITCHED, CONCURRENTLY-OPERATED OMNIDIRECTIONAL AND DIRECTIONAL ANTENNAS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas, and typically communicate through one or more access points.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5A is a graph of return loss for a vertical dipole array of a directional antenna, according to an embodiment.

FIG. 5B is a graph of return loss for a horizontal dipole array of a directional antenna, according to an embodiment.

FIG. 5C is a graph of return loss for an omnidirectional monopole antenna, according to an embodiment.

FIG. 5D is a graph of return loss for an omnidirectional dipole antenna, according to an embodiment.

FIG. 14A is a graph illustrating isolation between omnidirectional antennas of the MRMC network device of FIG. 11 radiating at the first frequency, according to an embodiment.

FIG. 14B is a graph illustrating isolation between directional antennas of the MRMC network device of FIG. 11, according to an embodiment.

FIG. 14C is a graph illustrating isolation between antennas radiating at the first frequency and antennas radiating at the second frequency, according to an embodiment.

DETAILED DESCRIPTION

Figure 1A:
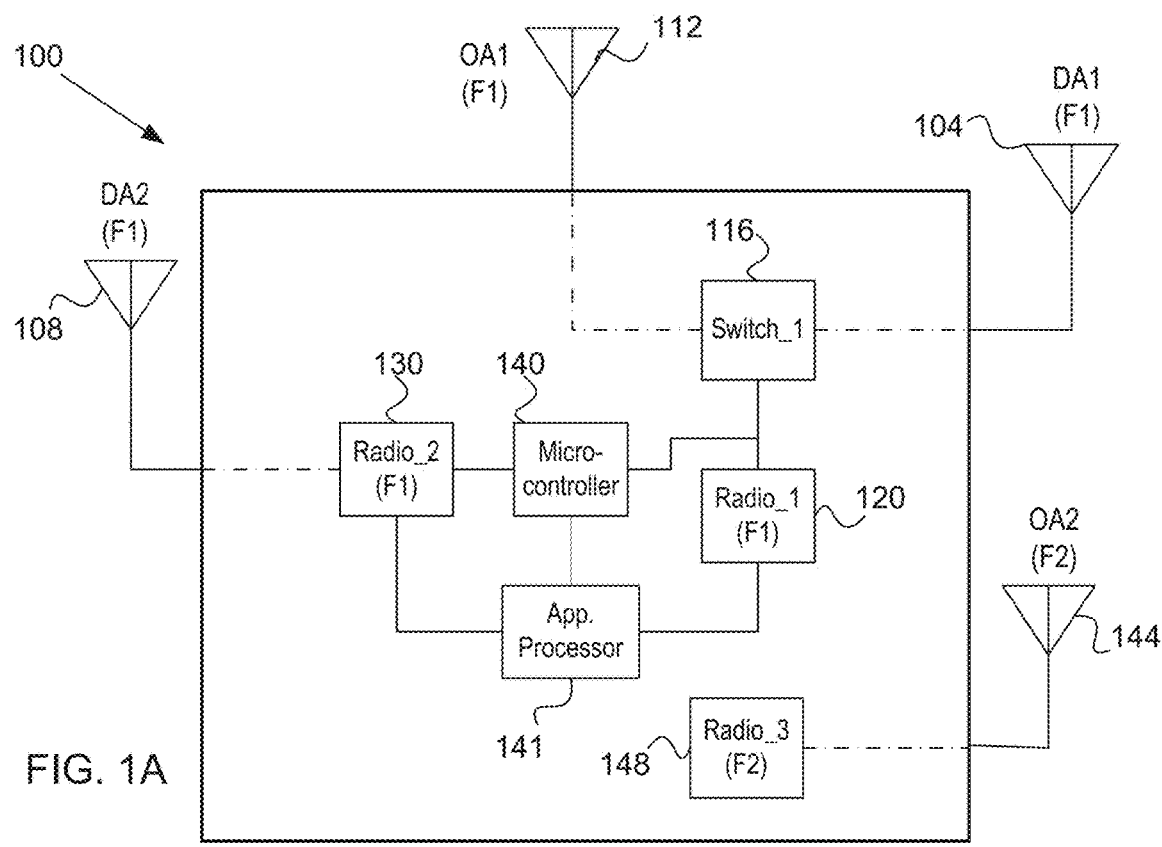
FIG. 1A is a block diagram of a multi-radio, multi-channel (MRMC) network device, according to an embodiment.

An access point (AP) in a wireless network may be a multi-radio, multi-channel (MRMC) network device in order to provide network connectivity at multiple frequencies over multiple channels. For example, popular radio frequencies include 5.0 GHz and 2.4 GHz, which may operate concurrently within the MRMC network device. Multiple different kinds of antennas may be deployed within a single MRMC network device to provide radiation coverage for a particular radio frequency (RF). Some MRMC network devices, in order to provide good coverage, have been built to be fairly large electronic devices with a number of radios and a number of antennas. With each additional radio and antenna, the electronic device also becomes more expensive to manufacturer, and requires more power to operate.

Accordingly, to reduce the size, cost, and power consumption of an MRMC network device, the present embodiments describe a MRMC network device that is compact, and uses fewer radios and antennas than many access point devices on the market, yet still provides excellent three-dimensional coverage for a first frequency at which the majority of the antennas radiate electromagnetic energy. An antenna system is disclosed that is based on intelligent switching between available antennas, to select the one or more antennas over which to radiate electromagnetic energy with the best channel performance for a particular client. To achieve the best coverage, a microcontroller (or an application processor) may control one or more switch to switch between directional antennas that radiate mostly outwards with high radiation pattern gain (e.g., with a two-dimensional emphasis), and omnidirectional antennas that radiate in all directions, and thus provide better coverage above and below the disclosed MRMC network device (e.g., with a three-dimensional emphasis). Such coverage may allow good coverage on a multi-floor building or other structure, and intelligent switching may allow extant power in the compact MRMC network device to be directed towards reaching existing clients.

In various embodiments, RF circuitry, which may be integrated within radios that are coupled to the antennas, may estimate certain radio frequency (RF) performance indicators (or RFPIs) in received signals from the antennas (e.g., via sampling, signal analysis, and/or other methods as will be discussed), which are associated with channels of the radios. The returned signals may come from particular clients that are receiving radio signals being radiated by the various antennas. The RFPIs may include, for example, one or more of received signal strength indicator (RSSI), interference level, throughput values, and bit error rate (BER). RSSI may be an indication of the power level being received by a receiver of the radio after the antenna and possible cable or line losses. Radio frequency interference (RFI) may be a disturbance generated by an external source that affects the receiver circuit of the radio by electromagnetic induction, electrostatic coupling, or conduction, and which may include returned signals from particular clients. Throughput, in a data transmission network, may be the amount of data moved successfully from one place to another in a given time period. In a digital transmission, BER may be the percentage of bits with errors divided by the total number of bits that have been transmitted, received, or processed over a given time period. Other transmission performance indicators are also envisioned.

The microcontroller may be operatively coupled to the radios and one or more switches. After an application processor determines an antenna that is associated with the best radio frequency performance indicator (RFPI), e.g., highest RSSI or throughput and/or lowest interference or BER, and signals the microcontroller. The microcontroller may select a radio as a transmit radio and control the one or more switches to select one or more transmit antennas. For example, the microcontroller may choose to select a directional antenna, a pair of directional antennas, an omnidirectional antenna, or a pair of omnidirectional antennas as the one or more transmit antennas. The radio that drives the one or more transmit antennas is selected as the transmit radio. In some embodiments, more than one transmit radio is selected and/or more than one antenna or pair of antennas are selected. Furthermore, in some embodiments, the microcontroller is combined within the application processor, e.g., into the same system on a chip.

FIG. 1A is a block diagram of a multi-radio, multi-channel (MRMC) network device 100, according to an embodiment. The MRMC network device 100 may include a first directional antenna 104, a second directional antenna 108, a first omnidirectional antenna 112, a switch 116 selectively coupled between the first directional antenna 104 and the first omnidirectional antenna 112, a first radio 120 coupled to the switch, a second radio 130 coupled to the second directional antenna 108, and a microcontroller 140 coupled to the first radio 120, the second radio 130, and the switch 116. An application processor 141 may also be coupled to the first radio 120, the second radio 130, and the microcontroller 140. In one embodiment, the microcontroller 140 is combined into the application processor 141.

The first radio 120 may send signals that cause the first directional antenna 104 and the first omnidirectional antenna 112 to radiate electromagnetic energy at a first frequency (F1). In one embodiment, the first frequency is 5 GHz, but other frequencies are envisioned. The second radio 130 may send signals that cause the second directional antenna 108 to also radiate electromagnetic energy at the first frequency. The MRMC network device 100 may also include a second omnidirectional antenna 144 coupled to a third radio 148. The third radio 148 may send signals that cause the second omnidirectional antenna 144 to radiate electromagnetic energy at a second frequency (F2). In one embodiment, the first frequency is 5 GHz and the second frequency is 2.4 GHz, but other frequencies are envisioned.

As discussed, each of the first radio 120 and the second radio 130 may include RF circuitry, which may estimate a radio frequency performance indicator (RFPI) value in received signals from each respective antenna. For example, first RF circuitry of the first radio 120 may estimate a RFPI value for signals received over the first directional antenna 104 and a second RFPI value received over the first omnidirectional antenna 112. Second RF circuitry for the second radio 130 may estimate a third RFPI value for signals received over the second directional antenna 108. Each RF performance indicator may include, for example, one or more of received signal strength indicator (RSSI), interference level, throughput values, and bit error rate (BER).

In various implementations, the application processor 141 may receive (or retrieve) the RFPI value from each radio, and determine a best indicator from the first RFPI value, the second RFPI value, and third RFPI value. In some cases the best indicator is the highest RFPI value, e.g., with respect to RSSI and throughput, while in other cases the best indicator is the lowest RFPI value, e.g., with respect to interference level and BER. Accordingly, a mix of these RFPIs value may be employed to identify the best-performing channel. The microcontroller 140 may then select a transmit antenna corresponding to the best indicator from the first directional antenna 104, the second directional antenna 108, and the first omnidirectional antenna 112. The microcontroller 140 may select a transmit radio from the first radio 120 and the second radio 130 that is coupled to the transmit antenna. The transmit antenna may then, in response to signals from the transmit radio, radiate electromagnetic energy at the first frequency. The decision regarding the selection of antennas and radios will be discussed in more detail with reference to FIG. 10A.

In various embodiments, the application processor 141 may include processing logic that may include hardware (e.g., circuitry, dedicated logic, programmable logic, microcode, etc.), software (such as instructions running on the processor), firmware or a combination thereof. Accordingly, in one embodiment, the MRMC network device 100 may include memory to store instructions to execute software code that may be used to process the RFPI values received from the radios, to determine the best-performing RFPI value or combination of RFPI values according to some predetermined algorithm. Such an algorithm may be revised externally or based on internal triggers, e.g., in the case environmental conditions change or the MRMC 100 is deployed to a different location.

Figure 1B:
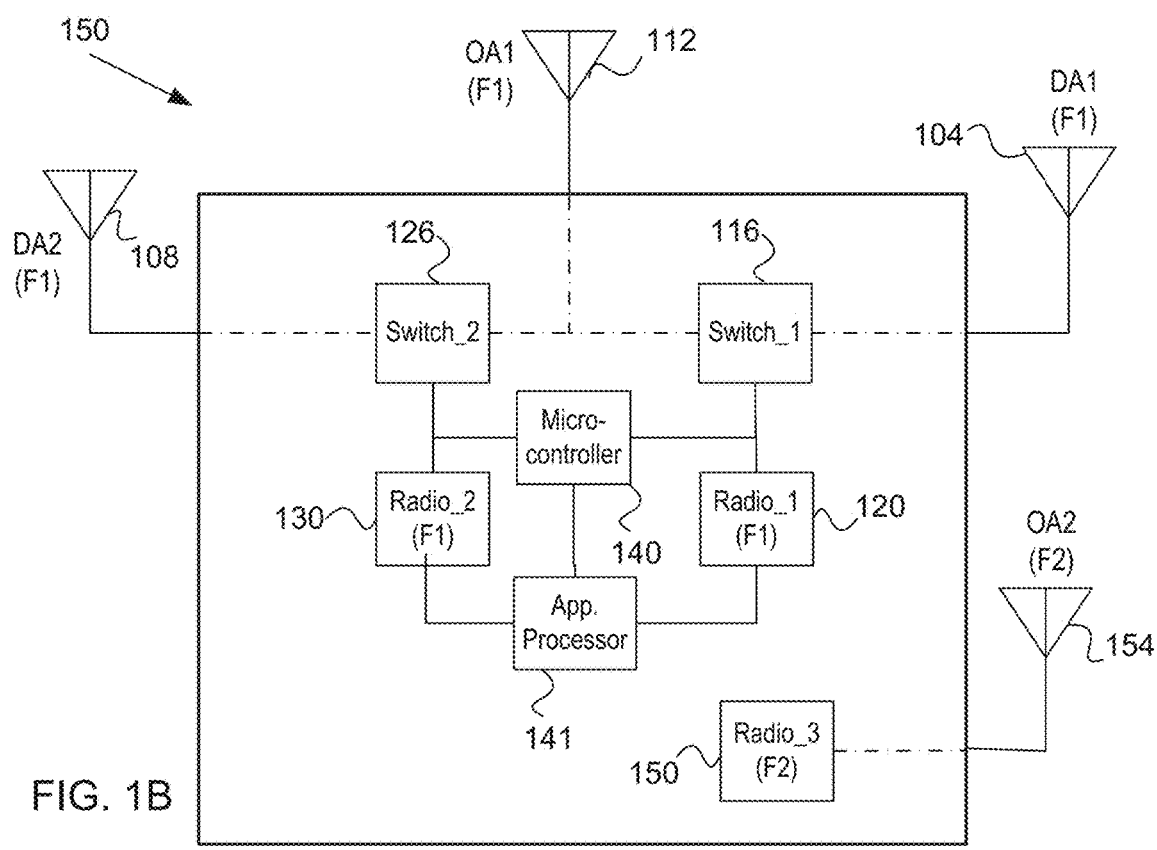
FIG. 1B is a block diagram of a MRMC network device, according to another embodiment.

FIG. 1B is a block diagram of a MRMC network device 150, according to another embodiment. The MRMC network device 150 is similar to the MRMC network device 100 of FIG. 1A, except for the addition of a second switch 126 coupled between the omnidirectional 112 and the second directional antenna 108. The second radio 130 and the microcontroller 140 are now also both coupled to the second switch 126. In the embodiment of FIG. 1B, the microcontroller 140 may now also select the omnidirectional antenna 112 or the second directional antenna 108 through control of the second switch 126, e.g., when also selecting the second radio 130. The decision, made by the application processor 141, regarding the selection of antennas and radios will be discussed in more detail with reference to FIG. 10B.

Figure 1C:
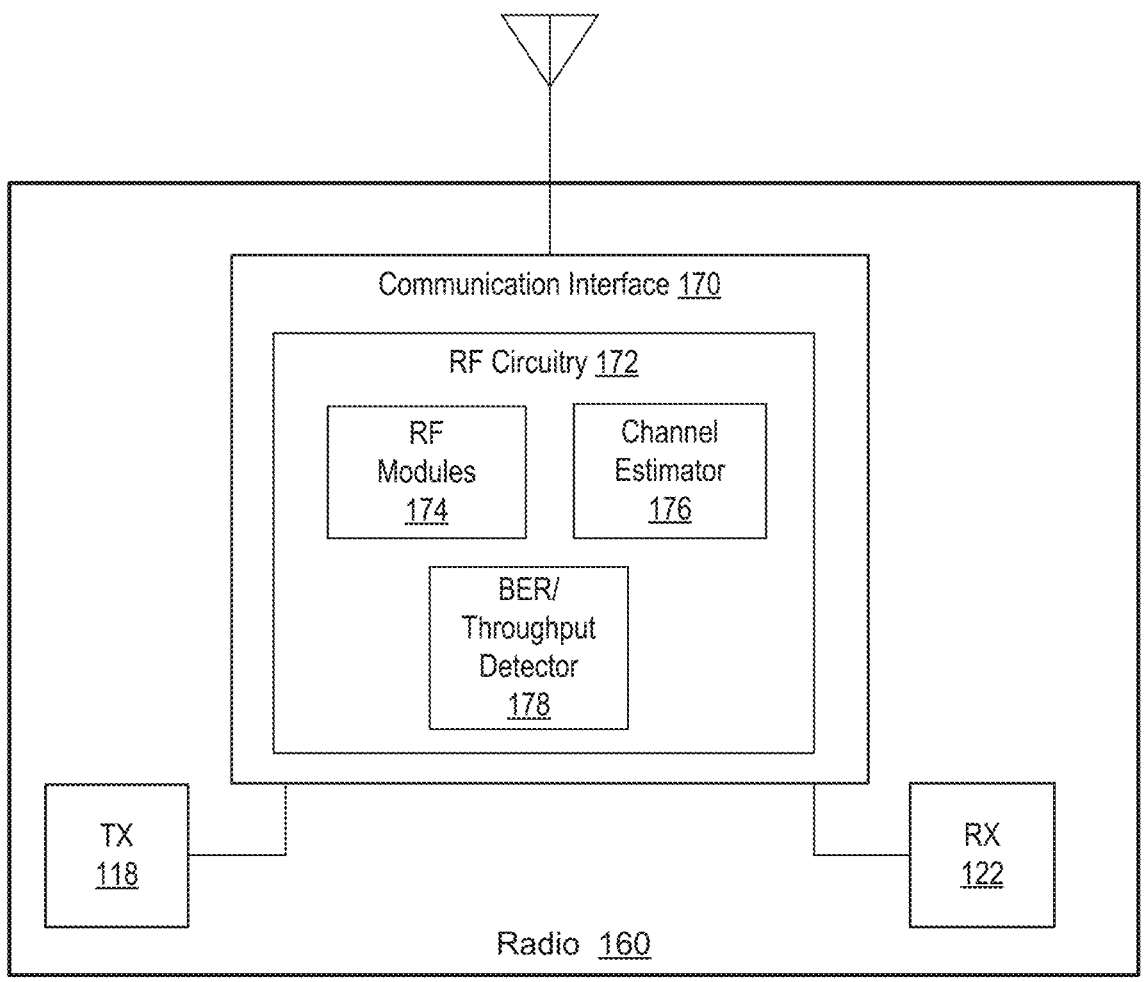
FIG. 1C is a block diagram of a radio illustrated in FIGS. 1A and 1B, according to an embodiment.

FIG. 1C is a block diagram of a radio 160, which may correspond to any of the radio 120, the radio 130, or the radio 150, which are illustrated in FIGS. 1A and 1B, according to an embodiment. The radio 160 may include a transmitter (TX) 118 and a receiver (RX) 122, which are coupled to a communication interface 170. The communication interface 170 in turn is coupled externally to an antenna, perhaps after additional amplification or filtering.

In various embodiments, the communication interface 170 may include RF circuitry 172, to include RF modules 174, a channel estimator 176, and a bit error rate (BER) and throughput detector 178. For example, one of the RF modules 174 may include a WiFi® PHY at which the RF energy of received RF signals may be measured for purposes of RSSI. In one embodiment, the channel estimator 178 may be a baseband channel estimator. The channel estimator 176 may be coupled to any antenna described herein, and thus a particular channel, and be adapted to estimate the RSSI measured for the particular channel by the RF module 174. One of the RF modules 174 may also be used to measure the interference level of a radio channel, e.g., in received signals over antenna(s). Furthermore, the BER and throughput detector 178 may measure and/or estimate the bit error rate and throughput of signals received over antenna(s). These sub-parts of the RF circuitry 172 of the communication interface 170 may further perform signal processing and statistical analysis to determine the RF performance indicator of interest for use by the microcontroller 140 in deciding which antenna(s) and radio(s) to choose.

Figures 2A, 2B:
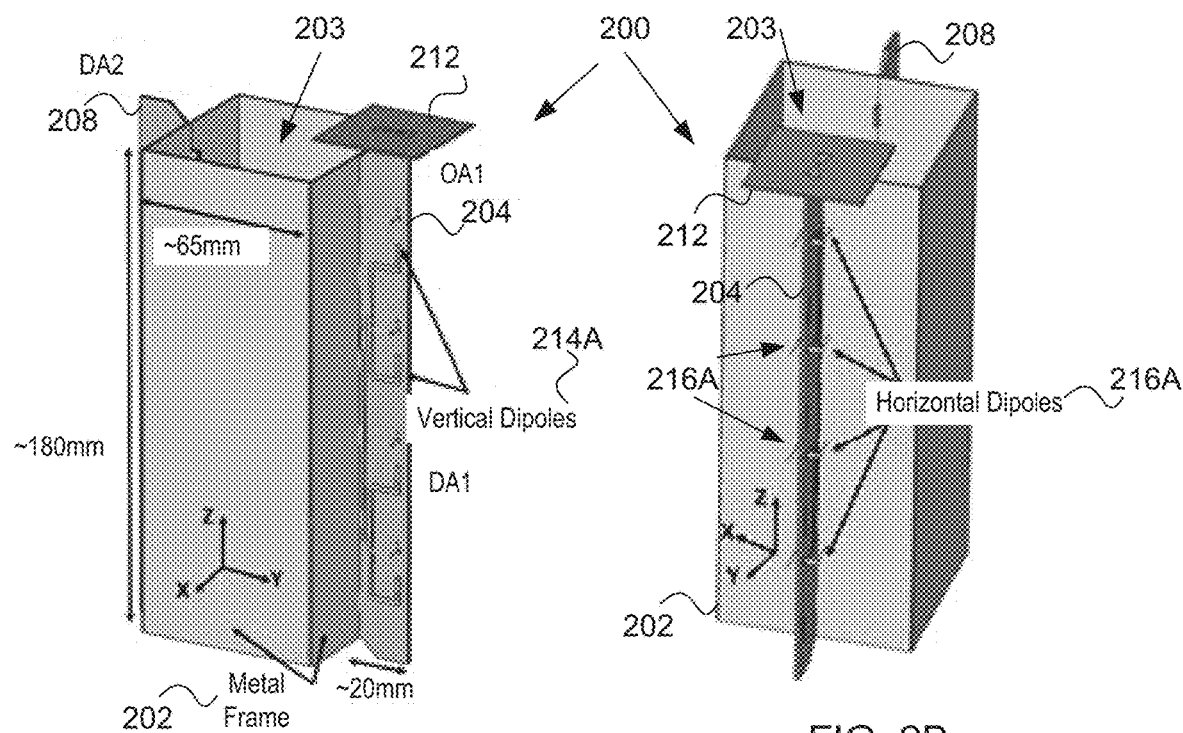
FIG. 2A is a perspective view of antenna structure of the MRMC network devices of FIGS. 1A and 1B, according to an embodiment.
FIG. 2B is another perspective view of the antenna structure of the MRMC network devices of FIGS. 1A and 1B, according to an embodiment.
Figures 2C, 2D:
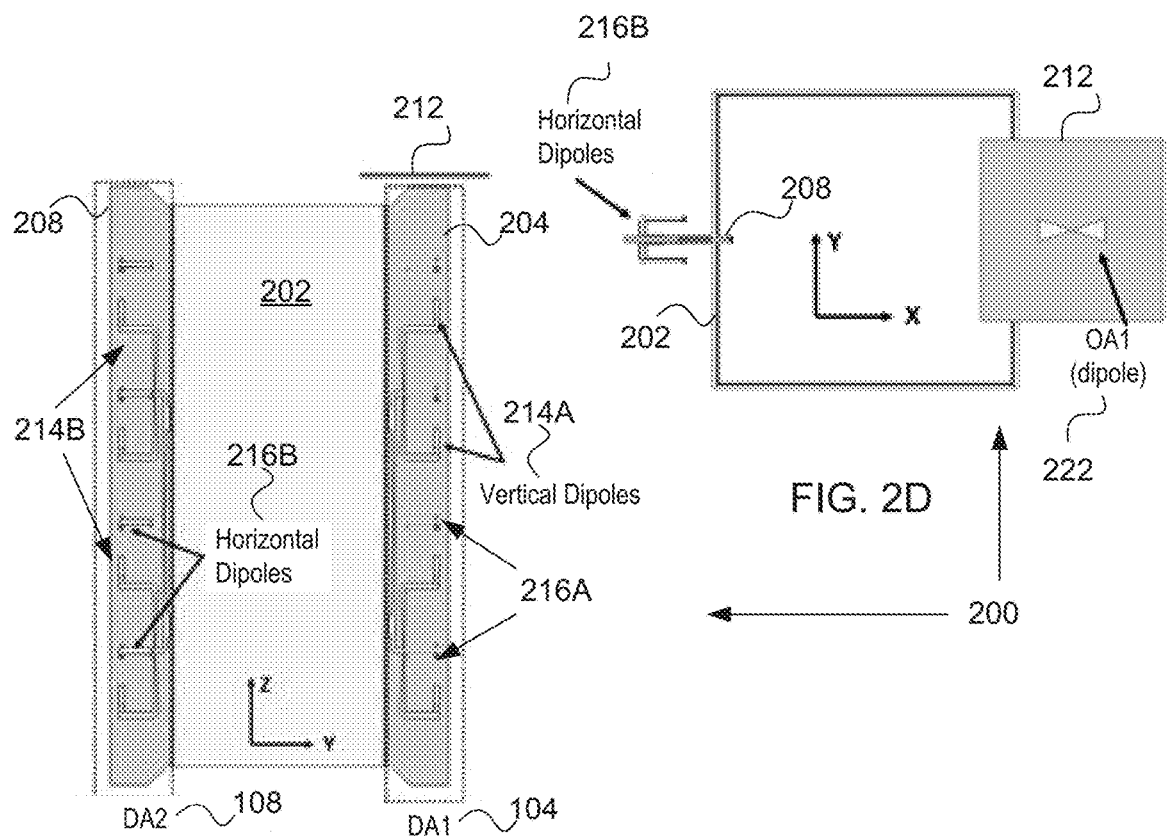
FIG. 2C is a side cross-section view of the antenna structure of the MRMC network devices of FIGS. 2A-2B, according to an embodiment.
FIG. 2D is a top view of the antenna structure of the MRMC network devices of FIGS. 2A-2B, according to an embodiment.

FIG. 2A is a perspective view of antenna structure 200 of the MRMC network devices 100 and 150 of FIGS. 1A and 1B, according to an embodiment. FIG. 2B is another perspective view of the antenna structure 200 of the MRMC network devices 100 and 150 of FIGS. 1A and 1B, according to an embodiment. FIG. 2C is a side cross-section view of the antenna structure of the MRMC network devices 100 and 150 of FIGS. 2A-2B, according to an embodiment. FIG. 2D is a top view of the antenna structure of the MRMC network devices 100 and 150 of FIGS. 2A-2B, according to an embodiment.

With reference to FIGS. 2A, 2B, 2C, and 2D, the antenna structure 200 may include, for example, a metal frame 202 having a first end (e.g., a top), a second end (e.g., a bottom), and multiple sides between the first end and the second end to form an inner chamber 203. In the depicted embodiment, the metal frame 202 has four sides, but there may be fewer or more sides. The antenna structure 200 may further include a first antenna carrier 204 attached to a first side of the metal frame 202 and a second antenna carrier 208 attached to a second side of the metal frame 202. The antenna structure 200 may further include a third antenna carrier 212 attached to the top of the metal frame 202. The antenna carriers may be, for example, printed circuit boards (PCBs) or other type of board or structure to carrier the disclosed antennas.

In various embodiments, the first directional antenna 104 may be disposed on the first antenna carrier 204, the second directional antenna 108 may be disposed on the second antenna carrier 208, and the first omnidirectional antenna 112 may be disposed on the third antenna carrier 212. In one embodiment, the first and second antenna carriers may be understood to be oriented in a first (or vertical) plane along a longitudinal axis formed by the sides of the metal frame 202. The first omnidirectional antenna 112 in this embodiment may include a dipole element 222, e.g., a bow-tie dipole element, and the third antenna carrier 212 may be oriented in a second (or horizontal) plane that is perpendicular to the vertical plane in which the directional antennas are disposed. In other embodiments, the first omnidirectional antenna 112 may be disposed on (e.g., at the first end of) either of the first antenna carrier 204 or the second antenna carrier 208. The orientation of the first omnidirectional antenna 112 perpendicular to the sides of the metal frame 202 (e.g., in being located in the horizontal plane) and/or attached to the first end of the MRMC network device 100 or 150 outside of the area in which are disposed the directional antennas, may contribute to isolation from the directional antennas.

In one embodiment, the sides are vertical sides, and the first side of the metal frame may be opposite the second side across the inner chamber 203, such that the first directional antenna 104 disposed on the first antenna carrier 204 is oriented in a first plane with the second directional antenna 108 disposed on the second antenna carrier 208. The orientation of the two directional antennas on opposite sides of the metal frame 202 at a first distance may provide greater isolation between the high radiation pattern gain of the first and second directional antennas.

Figure 7:
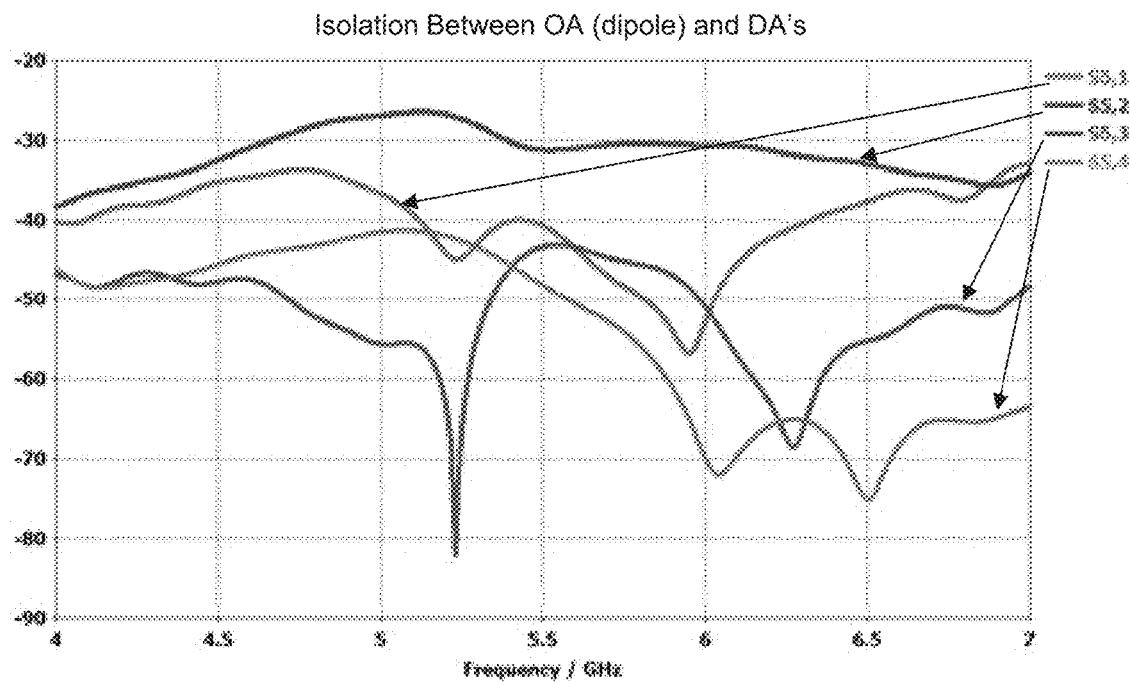
FIG. 7 is a graph illustrating isolation between an omnidirectional dipole antenna and a pair of directional antennas as illustrated in FIG. 6, according to an embodiment.
Figure 8:
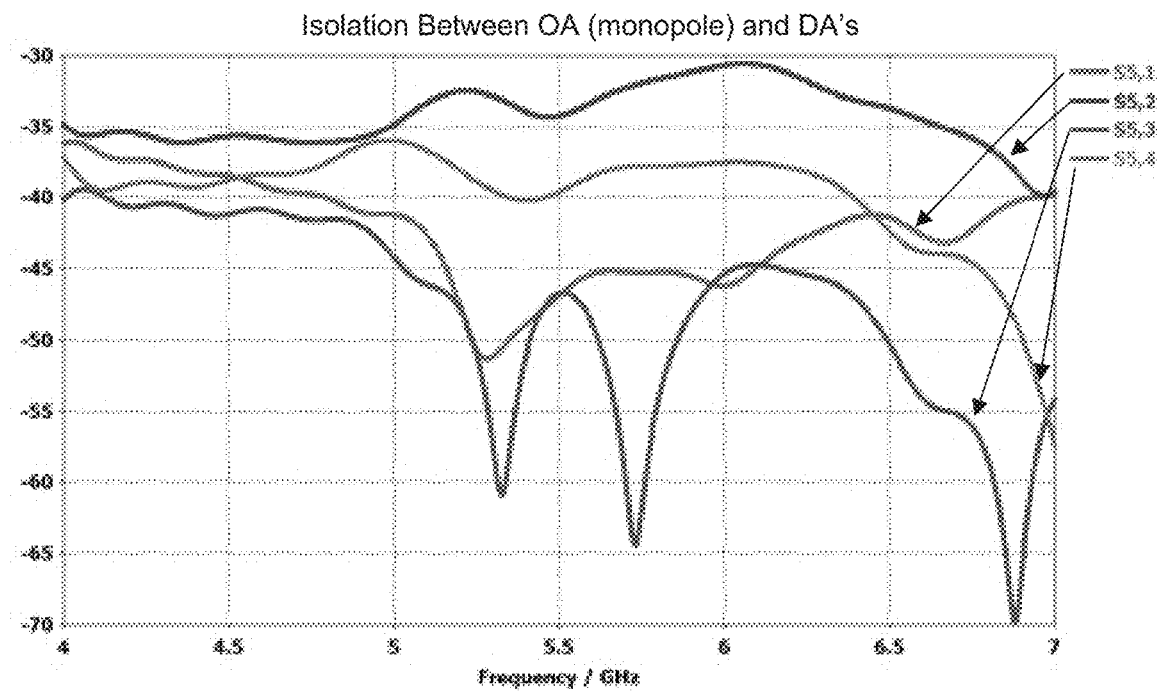
FIG. 8 is a graph illustrating isolation between an omnidirectional monopole antenna and a pair of directional antennas as illustrated in FIG. 6, according to an embodiment.
Figure 9:
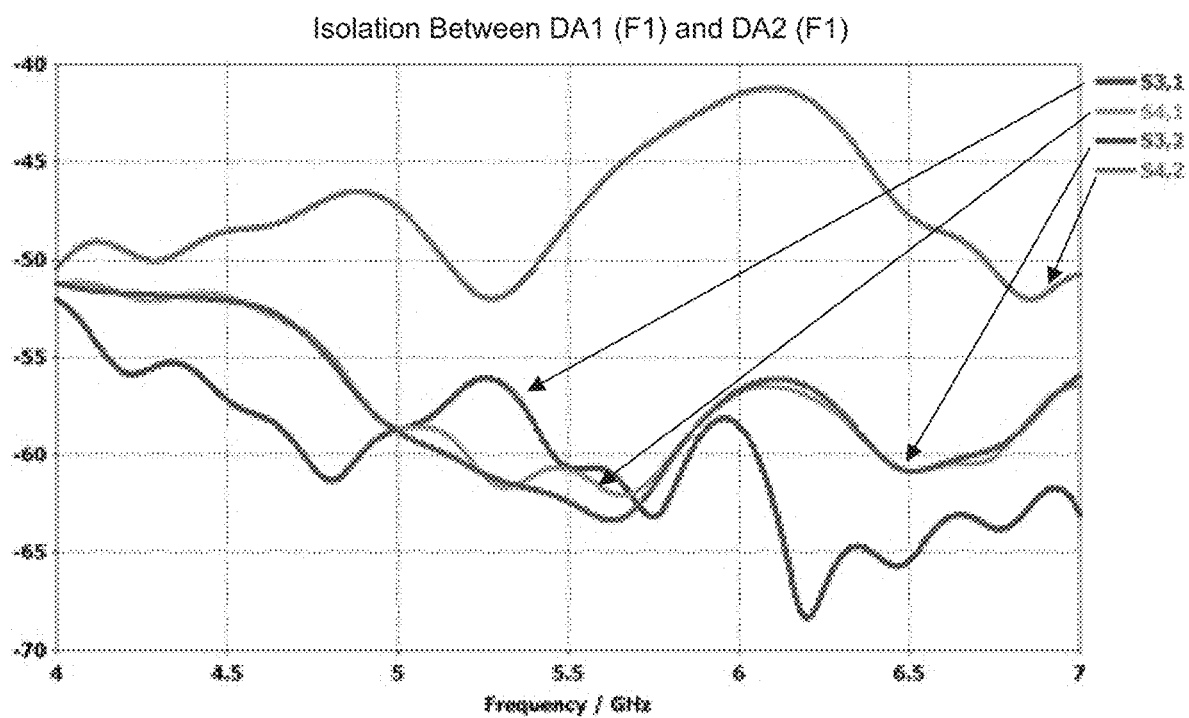
FIG. 9 is a graph illustrating isolation between a first directional antenna and a second directional antenna as illustrated in FIG. 6, according to an embodiment.

It is difficult to provide sufficient isolation between antennas that radiate electromagnetic energy at the same frequency, particularly in a small device with compact dimensions. In various embodiments, the metal frame 202 may be sized such that it has a height of between approximately 165 millimeters and 195 millimeters, e.g., about 180 millimeters. The metal frame 202 may also have a square cross-section, such that the width of the metal frame 202 is between about 60 millimeters and 70 millimeters, e.g., about 65 millimeters. The width of the metal frame 202 may therefore define the first distance between the first and second antenna carriers 204 and 208. These are small dimensions for a MRMC network device. During testing and design, these dimensions nonetheless provided even greater isolation between the directional antennas and between the directional antennas and the first omnidirectional antenna 112, positioned as depicted above the first directional antenna 104 disposed on the first antenna carrier 204. Note that isolation will be discussed in more detail with reference to FIGS. 7-9. In other embodiments, the metal frame 202 may have a triangular cross-section, octagonal cross-section, or other shaped cross-section and still provide adequate isolation between the antennas.

With further reference to FIGS. 2B-2C, each of the first directional antenna 104 and the second directional antenna 108 may include arrays of dipole elements (e.g., vertical and horizontal arrays of dipole elements) on both surfaces (front and back) to radiate with a cross-polarization pattern. More specifically, by way of example, the first directional antenna 104 may include a first array of horizontal dipole elements 216A disposed on both surfaces of the first antenna carrier 204, to radiate electromagnetic energy with horizontal polarization outwards from the metal frame 202. The first directional antenna 104 may also include a first array of vertical dipole elements 214A disposed on both surfaces of the first antenna carrier 204 to radiate electromagnetic energy with vertical polarization outwards from the metal frame 202. In one embodiment, various dipole elements of the first array of vertical dipole elements 214A are interspersed between several of the first array of horizontal dipole elements 216A, to radiate the electromagnetic energy with cross-polarization in a first direction away from the metal frame 202.

With continued reference to FIGS. 2B-2C, the second directional antenna 108 may further include a second array of horizontal dipole elements 216B, disposed on both surfaces of the second antenna carrier 208, to radiate electromagnetic energy with horizontal polarization in a direction away from the metal frame 202. The second directional antenna 108 may further include a second array of vertical dipole arms 114B disposed on both surfaces of the second antenna carrier 208 to radiate electromagnetic energy with vertical polarization in the same direction, away from the metal frame 202. In one embodiment, various vertical dipole elements of the second array of vertical dipole arms 114B are interspersed between several of the second array of horizontal dipole elements 116B, to radiate the electromagnetic energy with cross-polarization in a second direction, which is generally opposite that of the first direction.

Note that the vertical dipole elements of the first array of vertical dipole elements 214A and the second array of vertical dipole elements 214B may be shaped as vertical dipole arms that extend vertically to provide vertical polarization. As illustrated, the vertical dipole arms may be split arms, originating from a common connection trace, where one arm extends up and the other arm down. More specifically, a connected pair of the vertical dipole arms may include a first vertical dipole element and a second dipole element. The first vertical dipole element may include a first portion that extends away from a connection trace in a first direction to a first turn, a second portion that extends away from the first turn in a second direction to a second turn, and a third portion that extends away from the first turn in the first direction to complete a first arm shape. The second vertical dipole element may include a first portion that extends away from the connection trace in a third direction opposite to the first direction until a first turn, a second portion that extends away from the first turn in the second direction until a second turn, and a third portion that extends away from the second turn in the first direction, to complete a second arm shape.

With additional reference to FIG. 2D, each of the second array of horizontal dipole elements 216B may be formed as a protruded arm, which includes an L-shaped arm portion on each side of the antenna carrier 208. More specifically, each L-shaped arm portion horizontal dipole elements 216B may include a first portion attached to a surface of one of the antennas antenna carrier 208 and that extends away from the surface to a first turn, and a second portion that extends in parallel with the surface and back towards the metal frame 202. Each horizontal dipole element of the first array of horizontal dipole elements 216A may be similarly structured.

Figure 2E:
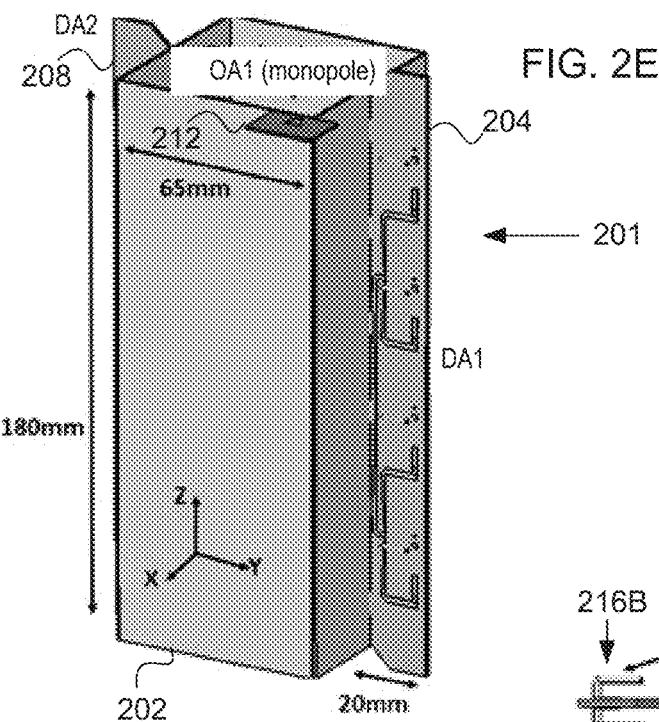
FIG. 2E is a perspective view of antenna structure of the MRMC network devices of FIGS. 1A and 1B, according to another embodiment.
Figure 2G:
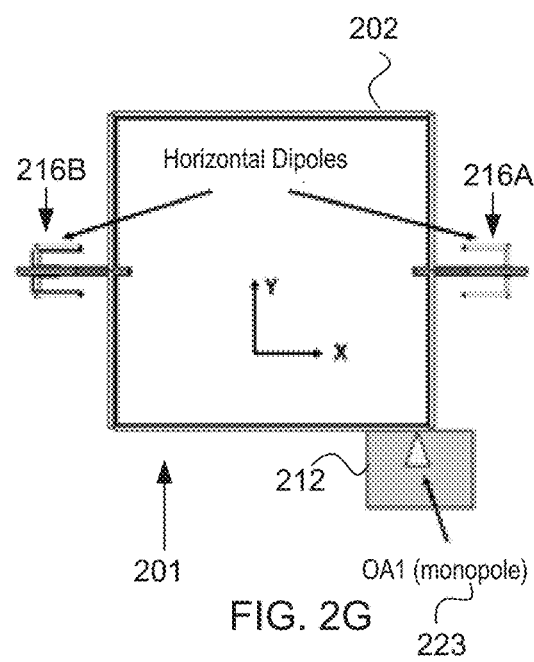
FIG. 2G is a top cross-section view of the antenna structure of the MRMC network device of FIG. 2G, according to an embodiment.
Figure 2F:
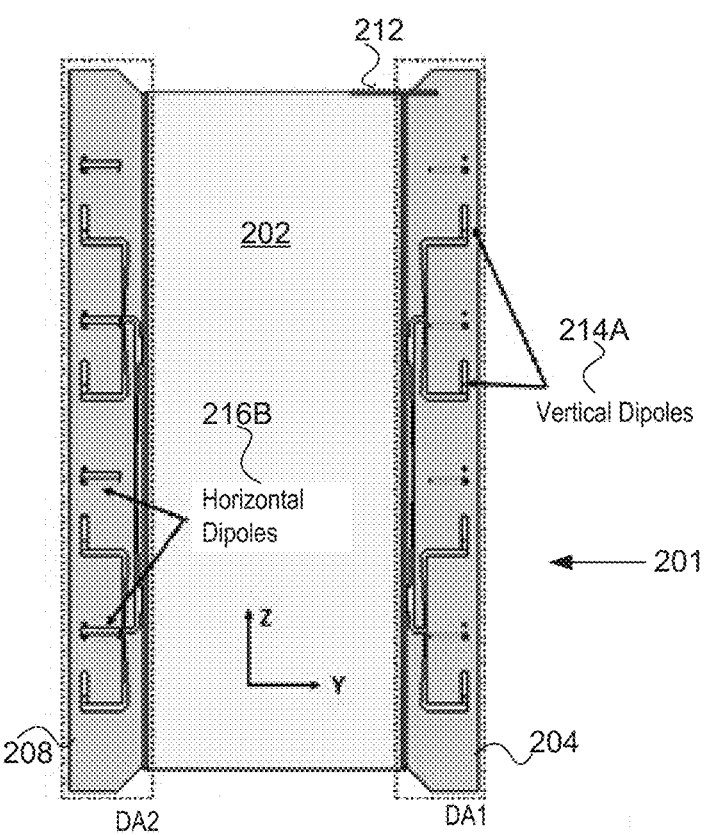
FIG. 2F is a side cross-section view of the antenna structure of the MRMC network device of FIG. 2E, according to an embodiment.

FIG. 2E is a perspective view of the antenna structure 200 of the MRMC network devices 100 and 150 of FIGS. 1A and 1B, according to another embodiment. FIG. 2F is a side cross-section view of the antenna structure 200 of the MRMC network device of FIG. 2E, according to an embodiment. FIG. 2G is a top cross-section view of the antenna structure 200 of the MRMC network device of FIG. 2G, according to an embodiment. The antenna structure 200 of FIGS. 2E, 2F, and 2G is similar to that of FIGS. 2A-2D, except that the third antenna carrier 212 may instead be attached to a corner (e.g., an exterior corner) of the metal frame 202 formed between one of the first side or the second side and a third side connected to the first side and, optionally, to the second side (or some additional side) of the metal frame 202 (best seen in FIG. 2G). The first omnidirectional antenna 112 in this embodiment may include a monopole element 223.

Figure 3A:
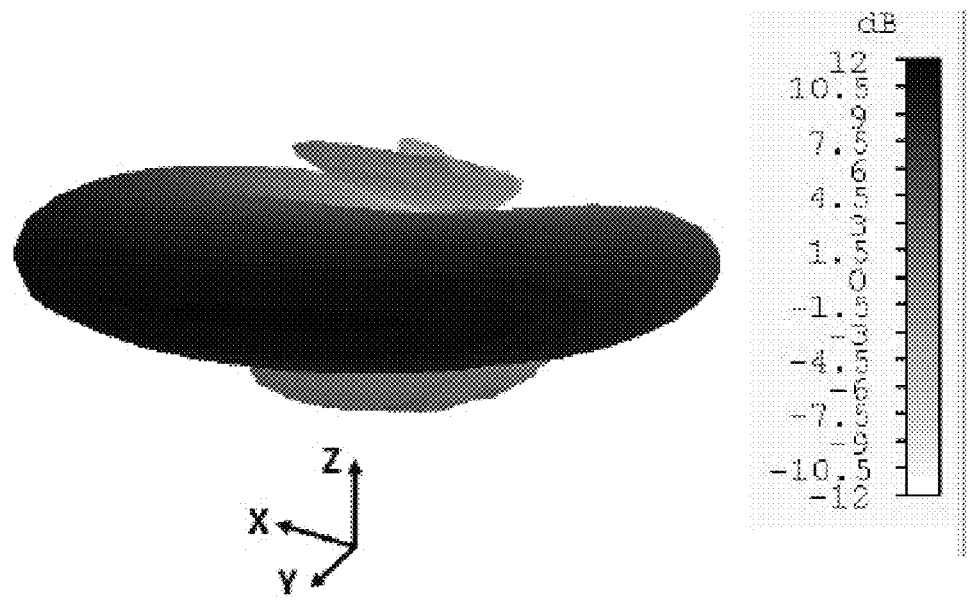
FIG. 3A is a radiation pattern of a vertical dipole array of a directional antenna, according to an embodiment.

FIG. 3A is a radiation pattern of a vertical dipole array of a directional antenna, e.g., the first array of vertical dipole elements 214A, according to an embodiment. The realized gain of this vertical dipole array, as tested, was about 11.7 dBi. Note that the high gain generated from the vertical polarization of the vertical dipole array is directed in a horizontal plane. Note also that the overlaid Cartesian coordinates in FIGS. 2A-2G correspond to those displayed in FIGS. 3A and 3B. A similar-looking radiation pattern, but oriented in the negative y direction would result for the second array of vertical dipole elements 214B.

Figure 3B:
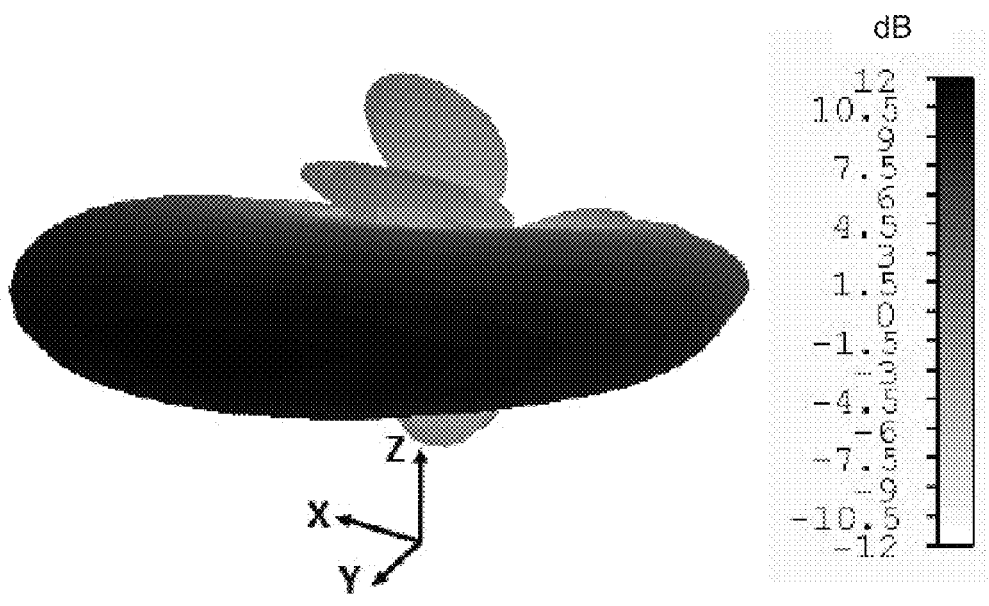
FIG. 3B is a radiation pattern of a horizontal dipole array of a directional antenna, according to an embodiment.

FIG. 3B is a radiation pattern of a horizontal dipole array of a directional antenna, e.g., the first array of horizontal dipole elements 216A, according to an embodiment. The realized gain of the horizontal dipole array, as tested, was about 11.9 dBi. Note the high gain generated from the horizontal polarization of the horizontal dipole array is also in a horizontal plane. A similar-looking radiation pattern, but oriented in the negative y direction would result for the second array of horizontal dipole elements 216B.

Figure 4A:
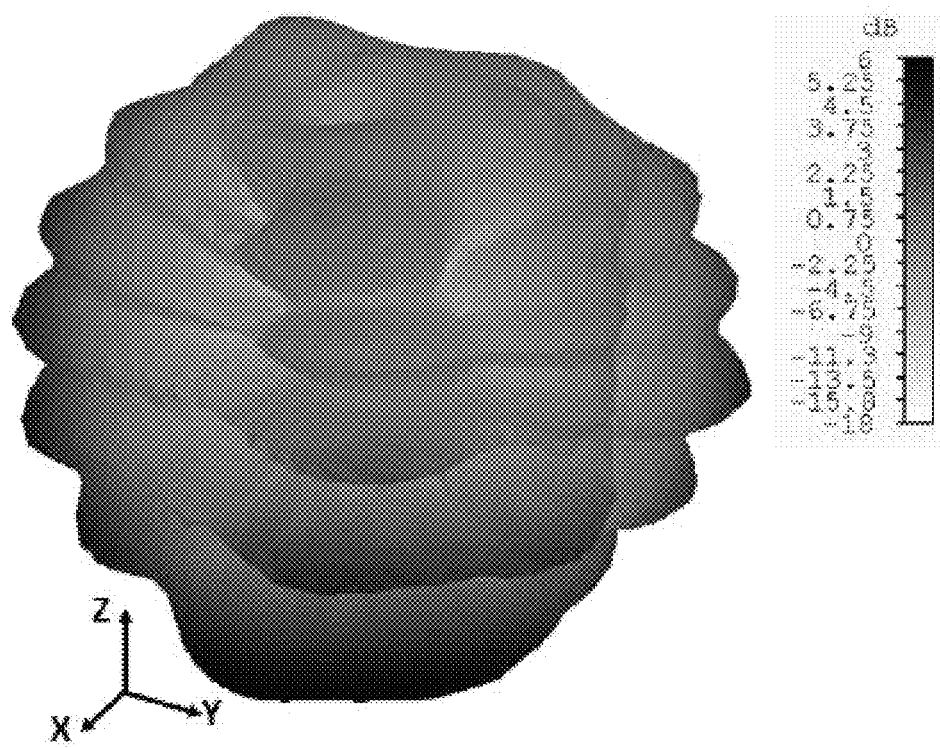
FIG. 4A is a radiation pattern of an omnidirectional dipole antenna, according to an embodiment.
Figure 4B:
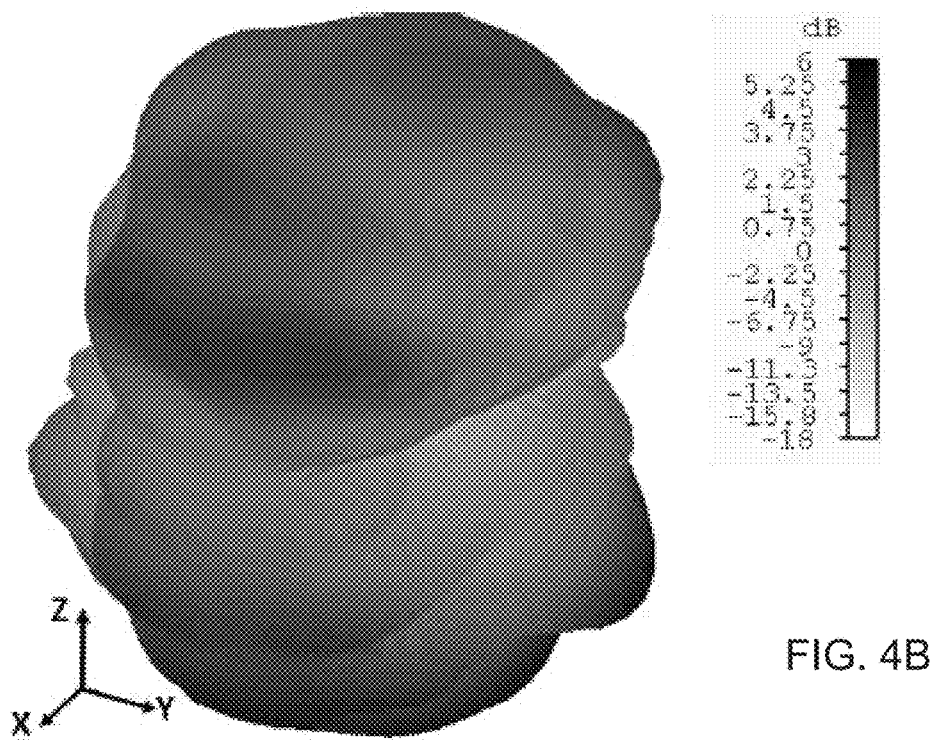
FIG. 4B is a radiation pattern of an omnidirectional monopole antenna, according to an embodiment.

FIG. 4A is a radiation pattern of an omnidirectional dipole antenna, e.g., the first omnidirectional antenna 112 that includes the dipole element 222, according to an embodiment. The realized gain of the dipole-based, omnidirectional antenna, as tested, was about 5.2 dBi. FIG. 4B is a radiation pattern of an omnidirectional monopole antenna, e.g., the first omnidirectional antenna 112 that includes the monopole element 223, according to an embodiment. The realized gain of the monopole-based, omnidirectional antenna, as tested, was about 6.1 dbi. Note that the gain of the omnidirectional radiation pattern of each of the omnidirectional dipole antenna and the omnidirectional monopole antenna radiates in all directions, with the omnidirectional monopole antenna have slightly better gain in a vertical plane.

FIG. 5A is a graph of return loss for a vertical dipole array of a directional antenna, e.g., for one of the first or second array of vertical dipole elements 214A or 214B being caused to radiate at about 5 GHz, according to an embodiment. FIG. 5B is a graph of return loss for a horizontal dipole array of a directional antenna, e.g., for one of the first or second array of the horizontal dipole elements 216A or 216B being caused to radiate at about 5 GHz, according to an embodiment. FIG. 5C is a graph of return loss for an omnidirectional monopole antenna, e.g., the first omnidirectional antenna 112 that includes the monopole element 223 being caused to radiate at about 5 GHz, according to an embodiment. FIG. 5D is a graph of return loss for an omnidirectional dipole antenna, e.g., the first omnidirectional antenna 112 that includes the dipole element 222 being caused to radiate at about 5 GHz, according to an embodiment.

Figure 6:
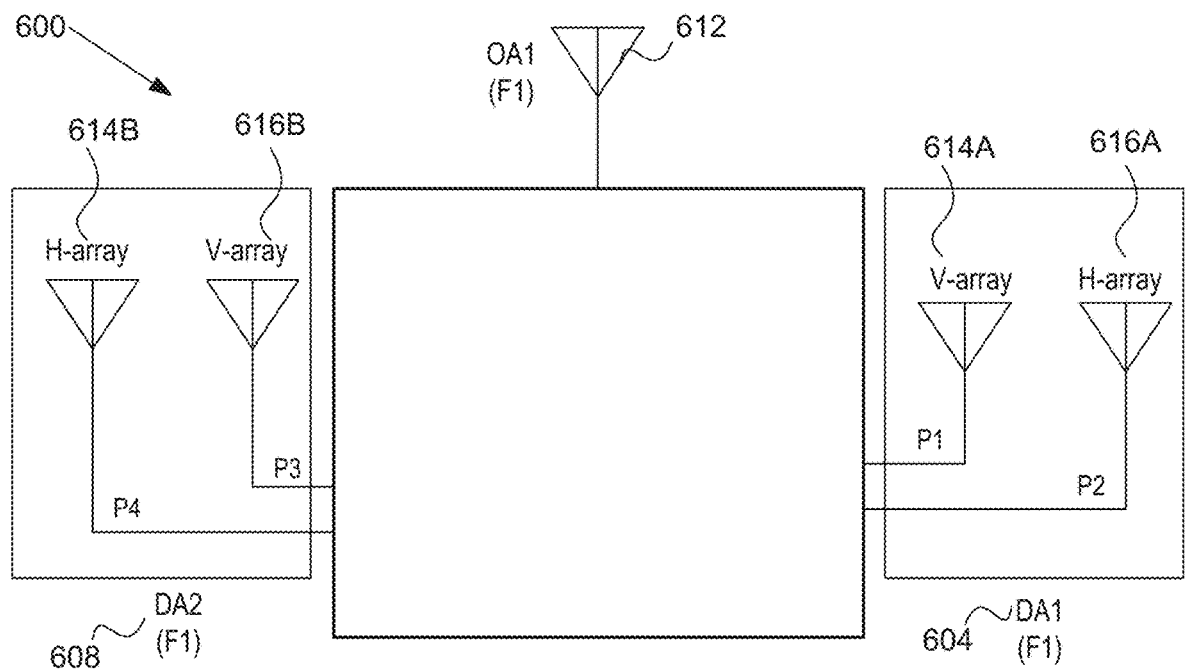
FIG. 6 is a block diagram of multiple ports of a MRMC network device, according to various embodiments.

FIG. 6 is a block diagram of multiple ports of a MRMC network device 600, according to various embodiments. The MRMC network device 600 may be any of those described herein, with reference to a first directional antenna 604, a second directional antenna 608, and a first omnidirectional antenna 612, each to be radiated with a first frequency, e.g., 5 GHz in the disclosed test results. The first directional antenna 604 may include a first array of vertical dipole elements 614A and a first array of horizontal dipole elements 616A, which may be arranged as explained with reference to FIGS. 2B-2D. The second directional antenna 608 may include a second array of vertical dipole elements 614B and a second array of horizontal dipole elements 616B, which may be arranged as explained with reference to FIGS. 2B-2D.

With additional reference to FIGS. 1A and 1B, the first radio 120 and the second radio 130 may operate at two different channels, each associated with a different frequency: $f_l$ and $f_h$, respectively. To avoid any alternative adjacent channel interference (AACI), the isolation between these channels may be set at about 70 dB. For example, assume that the victim channel is $f_h$ and the aggressor is $f_l$. The sensitivity of the radio operating at the victim channel, $S_{victim}$, may be given by Equation (1).

$$\text{Sensitivity}_{victim} = KTB + NF + SNR_{req} \quad (1)$$

The received power by the victim radio in the presence of the aggressor interference is given by Equation (2).

$$S_{rec,victim} = KTB + NF + SNR_{req} + I_{aggressor} \quad (2)$$

To avoid desense at the victim radio due to the aggressor interference, the power level of the interference should be much less than the noise level in the victim, e.g., $I_{aggressor}$ (per hertz)$<<KT$ (dBn/Hz), where K is the Boltzman constant. This inequality determines the required isolation between the aggressor and the victim. In the present example, by considering the output power of the aggressor radio, the isolation should be around 70 dB. In the present design, RF front-end filters provide 50 dB isolation. Therefore, the design was to provide at least 20 dB isolation between any two antennas. FIG. 6 illustrates the schematic block diagram of the details of antennas radiating at 5 GHz with certain port numbers (P1, P2, P3, P4, P5), to which will be referred in the graphs illustrated in FIGS. 7, 8, and 9. The scattering parameters are used to represent the isolation between the antenna ports. As it may be observed, the isolation between two antennas in all of the cases is better than 20 dB.

In order to achieve the above isolations, the physical distance between the antennas was designed with particular dimensions and the metal frame was interposed between the antennas, which helped reduce the intensity of the radiated fields from one antenna to another. Here, derived from the form factor of the device, the locations of the omnidirectional antennas are optimized so that the metallic frame of the MRMC network devices 100 and 150 does not have an adverse effect on the radiation pattern of the omnidirectional antennas, and at the same time the required isolation can be achieved. The metallic frame helps form the directional radiation patterns for the directional antennas 604 and 608 and increase the isolation at the same time. Furthermore, in order to have a good multiple-in, multiple-out (MIMO) channel performance, the present embodiments are designed with about 10 dB isolation between pairs of arrays within each directional antenna, e.g., between the first array of vertical dipole elements 614A and the first array of horizontal dipole elements 616A and between the second array of vertical dipole elements 614B and the second array of horizontal dipole elements 616B. This isolation may be achieved by using orthogonal polarizations (also referred to herein as cross-polarization) in each pair of arrays.

Figure 10A:
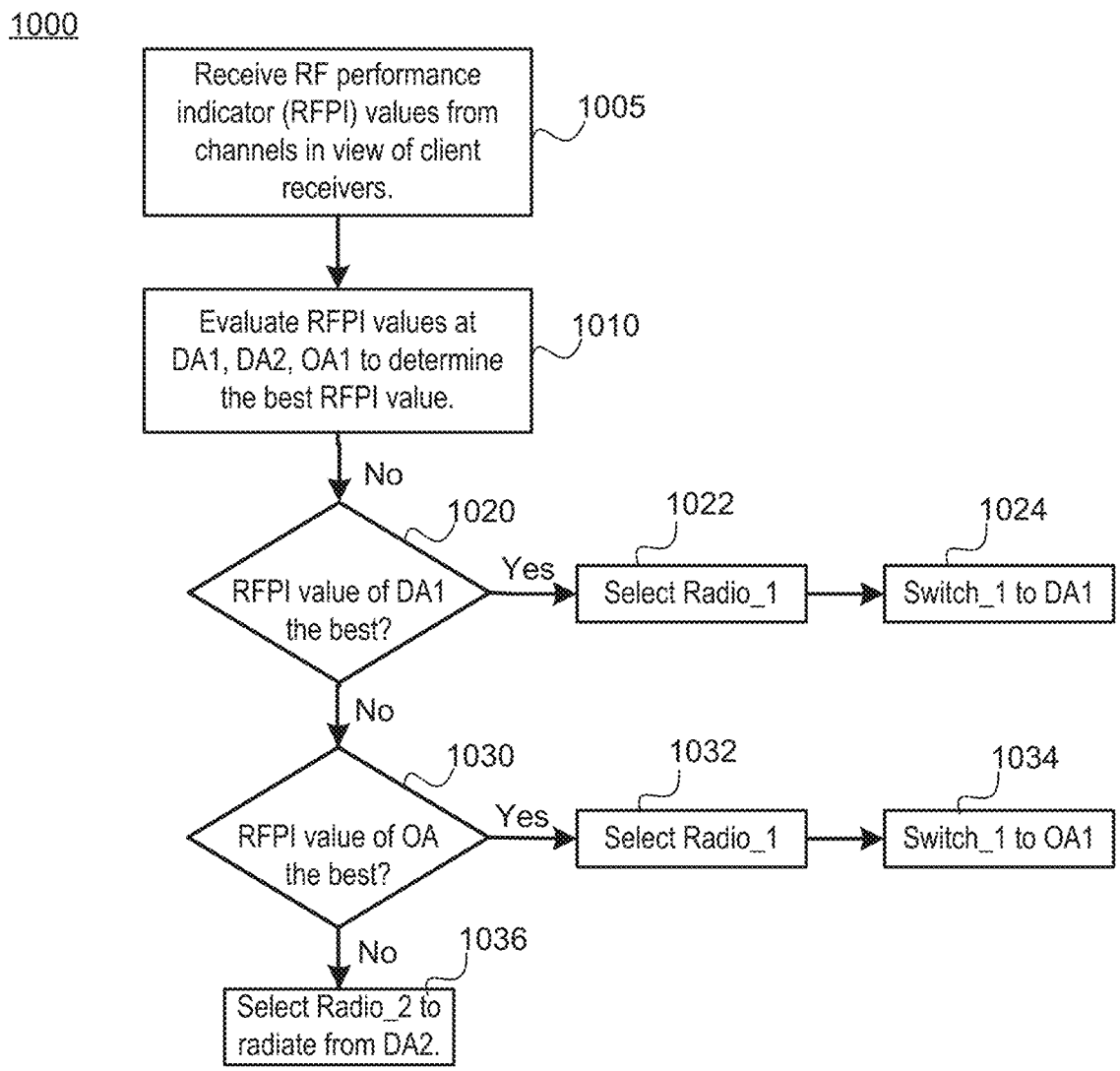
FIG. 10A is a flow chart of method for radio and switch selections associated with the MRMC network device of FIG. 1A, according to an embodiment.

FIG. 10A is a flow chart of method 1000 for radio and switch selections associated with the MRMC network device 100 of FIG. 1A, according to an embodiment. The method 1000 may be performed by processing logic that may include hardware (e.g., circuitry, dedicated logic, programmable logic, microcode, etc.), software (such as instructions running on the processor), firmware or a combination thereof. In one embodiment, the method 1000 is performed by a combination of the application processor 141 and the microcontroller 140 illustrated in FIG. 1A. In various embodiments, the application processor 141 may receive the RFPIs and determine a best RFPI value from the RFPIs, and the microcontroller 140 (or the application processor 141) may perform the antenna and radio selections to choose to radiate from a best-performing channel.

With reference to FIG. 10A, the method 1000 may begin with the processing logic receiving (or retrieving) a radio frequency performance indicator (RFPI) value from channels of the first and second radios 120 and 130 in view of one or more client receivers (1005). The RFPI value may be at least one of received signal strength indicator (RSSI), interference level, throughput, or a bit error rate. The method 1000 may continue with the processing logic evaluating a first RFPI value estimated from return signals received over the first directional antenna 104, a second RFPI value estimated from return signals received over the second directional antenna 108, and a third RFPI value estimated from return signals received over the first omnidirectional antenna 112, to determine the best RFPI value (1010).

The method 1000 may continue with determining whether the first RFPI value is the best RFPI value (1020). If the first RFPI value is best, the method may continue with selecting the first radio 120 (1022) and controlling the switch 116 to select the first directional antenna 104 (1024). This pair of selections may be performed at a first time. If the first RFPI value is not best, the method 1000 may continue with the processing logic determining whether the third RFPI value is the best RPFI value (1030). If the third RFPI value is best, the method 1000 may continue with the processing logic selecting the first radio 120 (1032) and controlling the switch 116 to select the first omnidirectional antenna 112 (1034). This pair of selections may be performed at a second time. If the third RFPI value is not best, the method 1000 may continue with the processing logic selecting the second radio 130 to radiate electromagnetic energy from the second directional antenna 108 (1036). This selection may be performed at a third time. Note that the process of elimination to select the radio and antenna that combine to provide the best-performing channel may be performed in a different order and still provide the same result.

Figure 10B:
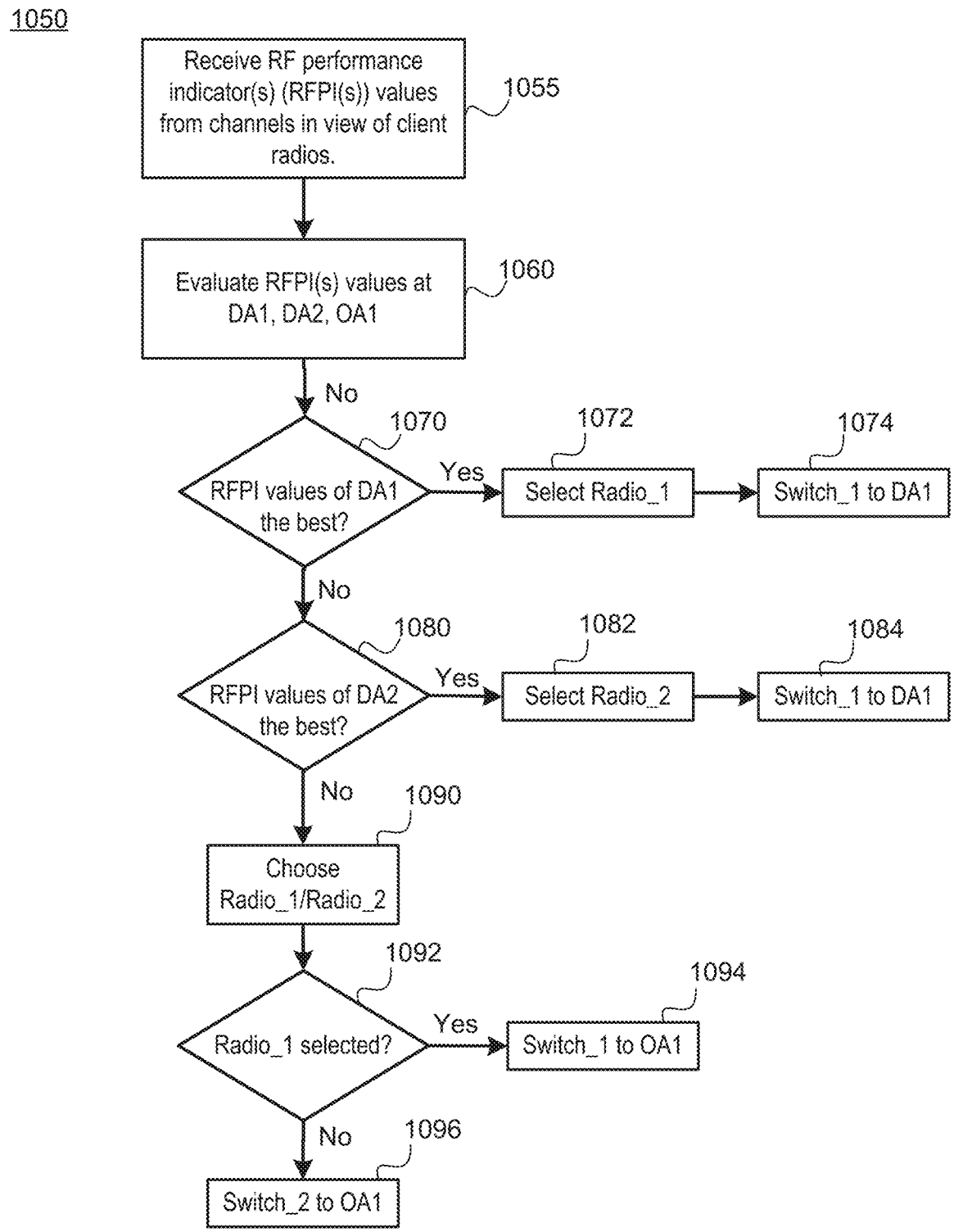
FIG. 10B is a flow chart of a method for radio and switch selections associated with the MRMC network device of FIG. 1B, according to an embodiment.

FIG. 10B is a flow chart of a method 1050 for radio and switch selections associated with the MRMC network device 150 of FIG. 1B, according to an embodiment. The method 1050 may be performed by processing logic that may include hardware (e.g., circuitry, dedicated logic, programmable logic, microcode, etc.), software (such as instructions running on the processor), firmware or a combination thereof. In one embodiment, the method 1050 is performed by a combination of the application processor 141 and the microcontroller 140 illustrated in FIG. 1B. In various embodiments, the application processor 141 may receive the RFPI values and determine a best RFPI value from the RFPI values, and the microcontroller 140 (or the application processor 141) may perform the antenna and radio selections to choose to radiate from a best-performing channel.

With reference to FIG. 10B, the method 1050 may begin with the processing logic receiving (or retrieving) a radio frequency performance indicator (RFPI) value from channels of the radios 120 and 130 in view of one or more client receivers (1055). The RFPI value may be at least one of received signal strength indicator (RSSI), interference level, throughput, or a bit error rate, e.g., any two or more of these RFIP values may also be combined (e.g., added) to form an aggregated RFPI value for use in deciding through which antenna to radiate electromagnetic energy. The method 1050 may continue with the processing logic evaluating a first RFPI value estimated from return signals received over the first directional antenna 104, a second RFPI value estimated from return signals received over the second directional antenna 108, and a third RFPI value estimated from return signals received over the first omnidirectional antenna 112, to determine the best RFPI value (1060). Note that the third RFPI value from the omnidirectional antenna 112 may be received (or retrieved) from either the first radio 120 or the second radio 130 as both may be selectively coupled to the coupled to the omnidirectional antenna 112.

The method 1050 may continue with determining whether the first RFPI value is the best RFPI value (1070). If the first RFPI value is the best, the method 1050 may continue with the processing logic selecting the first radio 120 (1072) and controlling the first switch 116 to select the first directional antenna 104 (1074). This set of selection may be performed at a first time. If the first RFPI value is not best, the method 1050 may continue with the processing logic determining whether the second RFPI value is the best indicator (1080). If the second RFPI value is best, the method 1050 may continue with the processing logic selecting the second radio 130 (1082) and controlling the second switch 126 to select the second directional antenna 108 (1084). This set of selections may be performed at a second time.

If neither the first RFPI value nor the second RFPI value are best, the method 1050 may continue with the processing logic selecting one of the first radio 120 or the second radio 130 (1090). In one implementation, the processing logic may also receive a fourth RFPI value from the second radio 130 for performance of a channel over the first omnidirectional antenna 112. If the third RFPI value and the fourth RFPI value differ, the processing logic may decide to use the best-performing of the third RFPI value and the fourth RFPI value. The method 1050 may further determine whether the first radio 120 was selected (1092). If the first radio 120 was selected, method 1050 may continue with the processing logic controlling the first switch 116 to select the omnidirectional antenna 112 (1094). This selection may be performed at a third time. If the second radio 130 was selected, the method 1050 may continue with the processing logic controlling the second switch 126 to select the first omnidirectional antenna 112 (1096). This selection may be performed at a fourth time. Note that the process of elimination to select the radio and antenna that combine to provide the best-performing channel may be performed in a different order and still provide the same result.

Figure 11:
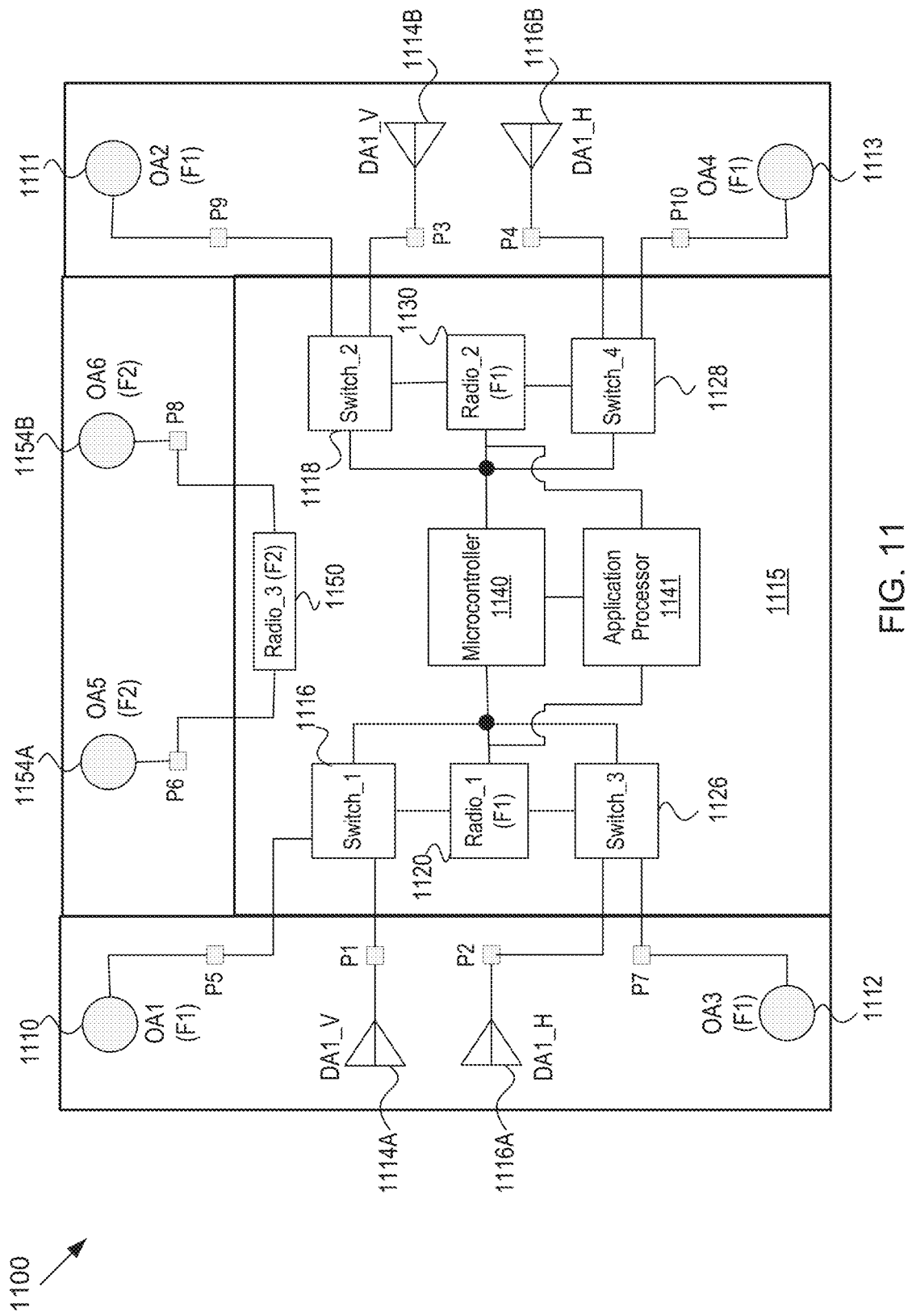
FIG. 11 is a block diagram of a MRMC network device, according to various embodiments.

FIG. 11 is a block diagram of a MRMC network device 1100, according to various embodiments. The MRMC network device 1100 provides a number of different combinations of directional and omnidirectional antennas, which are to be radiated at the same frequency (F1) through additional switches. The MRMC network device 1100 may include, but not be limited to, a first omnidirectional antenna 1110, a second omnidirectional antenna 1111, a third omnidirectional antenna 1112, and a fourth omnidirectional antenna 1113. The MRMC network device 1100 may further include a first directional antenna 1114A, a second directional antenna 1114B, a third directional antenna 1116A, and a fourth directional antenna 1116B. In one embodiment, the first directional antenna 1114A may be an array of vertical dipole elements, the second directional antenna 1114B may be an array of vertical dipole elements, the third directional antenna 1116A may be an array of horizontal dipole elements, and the fourth directional antenna 1116B may be an array of horizontal dipole elements.

The MRMC network device 1100 may further include, disposed on at least one circuit board 1115, a first radio 1120 coupled to a first switch 1116, which may selectively couple one or both of the first omnidirectional antenna 1110 and the first directional antenna 1114A to the first radio 1120. The MRMC network device 1100 may further include, disposed on the circuit board 1115, a third switch 1126 that is also coupled to the first radio. The third switch may selectively couple one or both of the third omnidirectional antenna 1112 and the third directional antenna 1116A to the first radio 1120.

The MRMC network device 1100 may further include, disposed on the circuit board 1115, a second radio 1130 coupled to a second switch 1118, which may selectively couple one or both of the second omnidirectional antenna 1111 and the second directional antenna 1114B to the second radio 1130. The MRMC network device 1100 may further include, disposed on the circuit board 1115, a fourth switch 1128 that is also coupled to the second radio. The fourth switch may selectively couple one or both of the fourth omnidirectional antenna 1113 and the fourth directional antenna 1116B to the second radio 1130.

The MRMC network device 1100 may further include a microcontroller 1140, disposed on the circuit board 1115, coupled to the first switch 1116, the second switch 1118, the first radio 1120, the third switch 1126, the fourth switch 1128, and the second radio 1130. The MRMC network device 1100 may further include an application processor coupled to the first radio 1120, the second radio 1130, and the microcontroller 1140. The application controller 1141 may decide, based on radio frequency performance indicator (RFPI) value estimated for signals received over each of the antennas, which of the one or more of the antennas to cause to radiate electromagnetic energy at the first frequency (e.g., 5 GHz, in one embodiment). Specifically, RF circuitry in the first and second radios 1120 and 1130 may estimate the RFPI values in return signals received over various channels from client devices positioned within the vicinity of and at any direction from the MRMC network device 1100. For example, the RF circuitry 172 (referenced in FIG. 1C) may be located in each of the first radio 1120 and the second radio 1130, to estimate one or more RFPI values over each antenna. The first and second radios may each communicate with coupled antennas over a different channel, and thus estimate a different RFPI value for each channel. In various embodiments, each RFPI value may include performance parameters such as at least one of received signal strength indicator (RSSI), interference level, throughput, a bit error rate, or some other RFPI value.

In various embodiments, the microcontroller 1140 (or application processor 1141 itself), for example, may select one or both of the first radio 1120 and the second radio 1130. When the microcontroller 1140 selects the first radio 1120, the microcontroller 1140 may also control the first switch 1116 and the third switch 1126 to select either the first and third omnidirectional antennas 1110 and 1112 or the first and third directional antennas 1114A and 1116A. When the microcontroller 1140 selects the second radio 1130, the microcontroller 1140 may control the second switch 1118 and the fourth switch 1128 to select either the second and fourth omnidirectional antennas 1111 and 1113 or the second and fourth directional antennas 1114B and 1116B. In this way, the MRMC network device 1100 may radiate electromagnetic energy out of the top and bottom of the MRMC network device 1100 using the omnidirectional antennas (e.g., for clients on other floors) or radiate electromagnetic energy out of the sides of the MRMC network device 1100 using the directional antennas (e.g., for client on the same floor).

In one embodiment, the microcontroller 1140 (or application processor 1141) may select the omnidirectional antennas based on RFPI values estimated by the first and second radios 1120 and 1130 for signals received from client devices positioned above or below the MRMC network device 1100 (e.g., in a home, office, or other edifice). Furthermore, the microcontroller 1140 may select the directional antennas based on RFPI values estimated for signals received back from client devices positioned in a horizontal plane radiating outwardly from the vertically-positioned directional antennas. For this reason, the omnidirectional antennas may be located outside (e.g., above or below) such a horizontal plane to help with isolation between the omnidirectional antennas and the directional antennas. Furthermore, through use of the switches and switching logic within the microcontroller 1140, no more than two radios are needed to operate at the first frequency (e.g., 5 GHz), thus reducing costs in a multi-radio, multi-channel device (although more 5 GHz radios may be employed).

In a first hybrid embodiment, the microcontroller 140 (or application processor 1141) may select a combination of the omnidirectional antennas and the directional antennas on one side or the other of the MRMC network device 1100, e.g., upon estimating that the RFPI value(s) of the channels on a particular side are strongest (e.g., best indicators) in both the up or down and the sideways directions. In this way, the MRMC network device 1100 may radiate electromagnetic energy with good coverage in one or more general directions that go both up and down and sideways. This embodiment may be preferable where the MRMC network device 1100 is positioned in the corner of or against an inner wall of a building, for example.

In this first hybrid embodiment, the microcontroller 1140 may select the first radio 1120 and control the first and third switches 1116 and 1126 to radiate electromagnetic energy at the first frequency over the first and third omnidirectional antennas 1110 and 1112 and over the first and third directional antennas 1114A and 1116A. Or, alternatively, the microcontroller 1140 may select the second radio 1130 and control the second and fourth switches 1118 and 1128 to radiate electromagnetic energy at the first frequency over the second and fourth omnidirectional antennas 1111 and 1113 and over the second and fourth directional antennas 1114B and 1116B.

In a second hybrid embodiment, the microcontroller 1140 (or application processor 1141) may select a combination of the omnidirectional antennas and directional antennas on a top half or a bottom half of the MRMC network device 1100, e.g., so that a device located in a bottom floor may radiate electromagnetic energy partially sideways and upwards or a device located on a top floor may radiate electromagnetic energy partially sideways and downwards. For example, if the device is located on the bottom floor of a building, the microcontroller 1140 may select the first radio 1120 and control the first switch 1116 to radiate electromagnetic energy from the first omnidirectional antenna 1110 and the first directional antenna 1114A, but not from the third omnidirectional antenna and third directional antenna 1116A. Concurrently, the microcontroller 1140 may also select the second radio 1130 and control the second switch 1118 to radiate electromagnetic energy from the second omnidirectional antenna 1111 and the second directional antenna 1114B, but not from the fourth omnidirectional antenna 1113 and the fourth directional antenna 1116B. Alternatively, these antenna choices may be swapped to cause the antennas located at the bottom half of the MRC network device 1100 to radiate electromagnetic energy when located on a top floor of the building.

In one embodiment, the MRMC network device 1100 may further include a third radio 1150 disposed on the circuit board 1115 that operates at a second frequency (e.g., 2.4 GHz in one implementation), which is coupled to a fifth omnidirectional antenna 1154A and to a sixth omnidirectional antenna 1154B, to cause the fifth and the sixth omnidirectional antennas 1154A and 1154B to radiate electromagnetic energy at the second frequency.

Figures 12A, 12B:
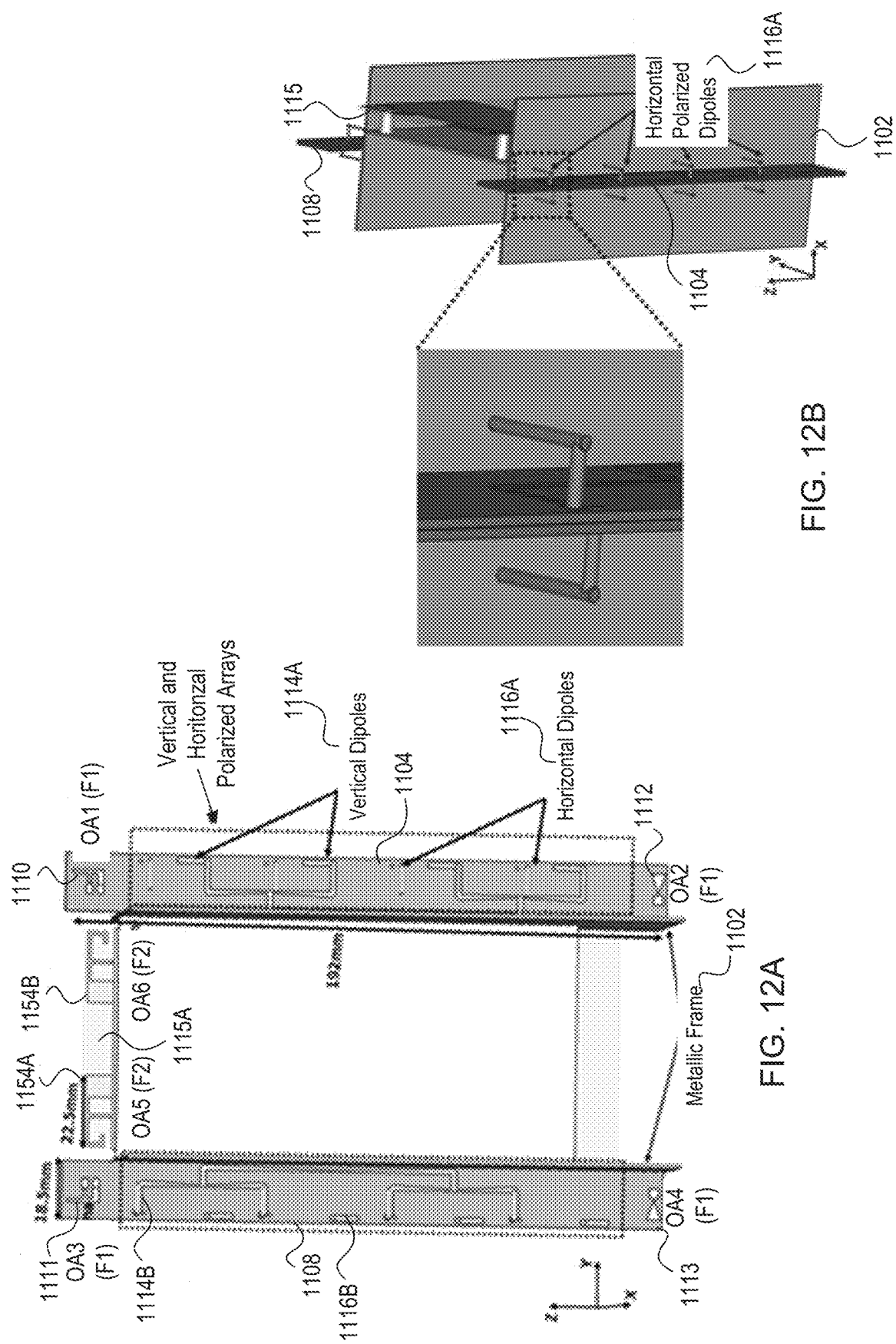
FIG. 12A is a side, cross-section view of the MRMC network device of FIG. 11, according to an embodiment.
FIG. 12B is a side, perspective view of the MRMC network device of FIG. 11, according to an embodiment.

FIG. 12A is a side, cross-section view of the MRMC network device 1100 of FIG. 11, according to an embodiment. FIG. 12B is a side, perspective view of the MRMC network device 1100 of FIG. 11, according to an embodiment. Note that the embodiment of FIGS. 11, 12A, and 12B is a variation to the embodiments of FIGS. 1A-1B and 2A-2G. Accordingly, not every feature is illustrated; instead, the additional antennas are illustrated that may be further controlled by way of the four switches 1116, 1118, 1126, and 1128.

With additional reference to FIG. 11, in a first embodiment, the MRMC network device 1100 includes a metal frame 1102 having four vertical sides that form an inner chamber, although more or fewer sides may be employed. A first printed circuit board 1104 may be attached to an outside surface of a first vertical side of the four vertical sides, and a second printed circuit board 1108 attached to an outside surface of a second vertical side of the four vertical sides, the second vertical side being opposite from the first vertical side across the inner chamber. Note that there may be more or fewer sides of the metal frame 1102 as previously mentioned. Furthermore, the first printed circuit board 1104 and second printed circuit board 1108 may further be another type of antenna carrier that is not a printed circuit board.

In at least one embodiment, the MRMC network device 1100 may further include the first omnidirectional antenna 1110 disposed on the first printed circuit board 1104, the first directional antenna 1114A disposed on the first printed circuit board 1104, a second omnidirectional antenna 1111 disposed on the second printed circuit board 1108, a second directional antenna 1114B disposed on the second printed circuit board. In one embodiment, the first printed circuit board 1104 includes a first extension portion that extends above the metal frame on which the first omnidirectional antenna 1110 is disposed. Similarly, the second printed circuit board 1108 may include a second extension portion that extends above the metal frame 1102 on which is disposed the second omnidirectional antenna.

In a further embodiment, one or both of the first omnidirectional antenna 1110 and the second omnidirectional antenna 1111 is a printed inverted F antenna (PIFA). An F portion (e.g., a top portion with the side extensions of the letter "F") of the first omnidirectional antenna 1110 may be oriented towards the F portion of the second omnidirectional antenna 1111, such that both the first and the second omnidirectional antennas 1110 and 1111 radiate generally upwards away from the metal frame 1102, e.g., away from the directional antennas. Other types of omnidirectional antennas are envisioned, including a dipole antenna or monopole antenna, for example. Note that the directional antennas disclosed with reference to the MRMC network device 1100 may be of a substantially identical design as that described with reference to FIGS. 2B, 2C, and 2D.

The MRMC network device 1100 may further include no more than two radios, which operate at a first frequency (e.g., 5 GHz), disposed on the circuit board 1115, the two radios including the first radio 1120 and the second radio 1130 (FIG. 11). The first radio 1120 may include first RF circuitry (e.g., a first channel estimator) to estimate a first RFPI value (e.g., first RSSI value) for signals received over the first omnidirectional antenna 1110 and estimate a second RFPI value (e.g., second RSSI value) for signals received over the first directional antenna 1114A. The second radio 1130 may include second RF circuitry (e.g., a second channel estimator) to estimate a third RFPI value (e.g., third RSSI value) for signals received over the second omnidirectional antenna 1111 and estimate a fourth RFPI value (e.g., fourth RSSI value) for signals received over the second directional antenna 1114B. Additional RFPIs may include, for example, interference level, throughput, or a bit error rate, among others.

The MRMC network device 1100 may further include the first switch 1116 disposed on the circuit board 1115 (e.g., a third printed circuit board in one embodiment) and coupled to the first radio 1120. The first switch 1116 may selectively couple one or both of the first omnidirectional antenna 1110 and the first directional antenna 1114A to the first radio. The second switch 1118 may also be disposed on the circuit board 115 and may selectively couple one or both of the second omnidirectional antenna 1111 and the second directional antenna 1114B to the first radio.

The MRMC network device 1100 may further include the microcontroller 1140 disposed on the circuit board 1115 and operatively coupled to the first radio 1120, to the first switch 1116, to the second radio 1130, and to the second switch 1118. The application processor 1141 may also be disposed on the circuit board 1115 and coupled to the first radio 1120, the second radio 1130, and the microcontroller 1140.

According to the first embodiment, the application processor 1141 may be configured to receive, from the first RF circuitry, a first RFPI value for signals received over the first omnidirectional antenna 1110 and a second RFPI value for signals received over the first directional antenna 1114A. The application processor 1141 may further receive, from the second channel estimator, a third RFPI value for signals received over the second omnidirectional antenna 1111 and a fourth RFPI value for signals received over the second directional antenna 1114B. The application processor 1141 may further determine a best RFPI (e.g., highest RSSI) from among the first RFPI, the second RFPI, the third RFPI, and the fourth RFPI.

In various embodiments, the microcontroller 1140 may be configured to, in response to signals from the application processor 1141, control at least one of the first switch 1116 or the second switch 1118 to select a transmit antenna corresponding to the best RFPI from the first omnidirectional antenna 1111, the first directional antenna 1114A, the second omnidirectional antenna 1111, and the second directional antenna 1114B. The microcontroller 1140, also in response to signals from the application processor 1141, may select a transmit radio from the first radio 1120 and the second radio 11130 that is coupled to the transmit antenna, such that the transmit antenna, in response to signals from the transmit radio, is to radiate electromagnetic energy at the first frequency. Within the first embodiment, the microcontroller 1140 may select the radios and control the first and second switches 1116 and 1118 to select just the omnidirectional antennas or just the directional antennas, as discussed with reference to the MRMC network devices 110 and 150.

Note that the first embodiment, which has been described with reference to the first omnidirectional antenna 1110, the first directional antenna 1114A, the second omnidirectional antenna 1111, and the second directional antenna 1114B, is but exemplary, and may be applied as well to the third omnidirectional antenna 1112, the third directional antenna 1116A, the fourth omnidirectional antenna 1113, and the fourth directional antenna 1116B, in a second embodiment. These additional antennas are illustrated and will be discussed in more detail below.

Further note that the first embodiment, which has been described with reference to the first omnidirectional antenna 1110, the first directional antenna 1114A, the second omnidirectional antenna 1111, and the second directional antenna 1114B, is but exemplary, and may be applied as well to the first omnidirectional antenna 1111, the first directional antenna 1114A, to the third omnidirectional antenna 1112, and the third directional antenna 1116, in a third embodiment. In the third embodiment, the microcontroller 1140 may be coupled to a single radio (e.g., the first radio 1120) within the MRMC network device 1110.

Further note that the first embodiment, which has been described with reference to the first omnidirectional antenna 1110, the first directional antenna 1114A, the second omnidirectional antenna 1111, and the second directional antenna 1114B, is but exemplary, and may be applied as well to the second omnidirectional antenna 1111, the second directional antenna 1114B, the fourth omnidirectional antenna 1113, and the fourth directional antenna 1116B, in a fourth embodiment. In the fourth embodiment, the microcontroller 1140 may be coupled to but a single radio (e.g., the second radio 1130) within the MRMC network device 1100.

In a further (e.g., sixth) embodiment, in addition to the configuration according to the first embodiment, the MRMC network device 1100 may further include the third omnidirectional antenna 1112 disposed on the first printed circuit board 1104, where the first RF circuitry is further to estimate a fifth RFPI (e.g., fifth RSSI) value for signals received over the third omnidirectional antenna 1112. The MRMC network device 1100 may further include a third directional antenna 1116A disposed on the first printed circuit board 1104. The first RF circuitry may further estimate a sixth RFPI (e.g., sixth RSSI) value for signals received over the third directional antenna 1116A. In one embodiment, the application processor 1141 may combined the second RFPI value and the sixth RFPI value for signals received over a combination of the first array of horizontal dipole elements and the first array of vertical dipole elements, which may be interspersed with each other (as previously discussed), and therefore radiate electromagnetic energy with cross-polarization away from the first side of the metal frame 1102.

With further reference to the sixth embodiment, the MRCM network device 1100 may further include the fourth omnidirectional antenna 1113 disposed on the second printed circuit board 1108, such that the second RF circuitry is further to estimate a seventh RFPI (e.g., seventh RSSI) value for signals received over the fourth omnidirectional antenna 1113. The MRMC network device 1100 may further include the fourth directional antenna 1116B disposed on the second printed circuit board 1108. The second RF circuitry may further estimate an eighth RFPI value for signals received over the fourth directional antenna 1116B. In one embodiment, the application processor 1141 may combine the fourth RFPI value and the eight RFPI value for signals received over a combination of the second array of horizontal dipole elements and the second array of vertical dipole elements, which may be interspersed with each other (as previously discussed), and therefore radiate electromagnetic energy with cross-polarization away from the second side of the metal frame 1102. Note also that, in one embodiment, each of the third omnidirectional antenna 1112 and the fourth omnidirectional antenna 1113 may be a triangular monopole antenna, although other types of omnidirectional antennas are envisioned, including a printed F-type, inverted F-type, or a dipole antenna.

With further reference to the sixth embodiment, the MRCM network device 1100 may further include the third switch 1126 disposed on the circuit board 1115 and coupled to the second radio 1130. The third switch 1126 may selectively couple one or both of the third omnidirectional antenna 1112 and the third directional antenna 1116A to the second radio 1130. The fourth switch 1128, furthermore, may also be disposed on the circuit board 1115 and coupled to the second radio 1130. The fourth switch 1128 may selectively couple one or both of the fourth omnidirectional antenna 1113 and the fourth directional antenna 1116B to the second radio 1130.

In one embodiment, the application processor 1141 may receive, from the first RF circuitry, a fifth RFPI value (e.g., fifth RSSI value) for signals received over the third omnidirectional antenna 1112 and a sixth RFPI value (e.g., RSSI value) for signals received over the third directional antenna 1116A (e.g., first array of horizontal dipoles elements). The application processor 1141 may further receive, from the second RF circuitry, a seventh RFPI value (e.g., RSSI value) for signals received over the fourth omnidirectional antenna 1113 and an eighth RFPI value (e.g., RSSI value) for signals received the fourth directional antenna 1116B (e.g., second array of horizontal dipoles). The application processor 1141 may determine that a combination (e.g., addition) of the first RFPI value, the third RFPI value, the fifth RFPI value, and the seventh RFPI value performs better (e.g., higher in the case of RSSI) than a combination (e.g., addition) of the second RFPI value, fourth RFPI value, sixth RFPI value, and eight RFPI value.

In this embodiment, the microcontroller 1140 (or application processor 1141) may control the first switch 1116 to select the first omnidirectional antenna 1110, the second switch 1118 to select the second omnidirectional antenna 1111, the third switch 1126 to select the third omnidirectional antenna 1112, and the fourth switch 1128 to select the fourth omnidirectional antenna 1113, through which to radiate electromagnetic energy at the first frequency. Alternatively, the microcontroller 1140 may determine that the opposite is true and control the first, second, third, and fourth switches 1116, 1118, 1126, and 1128 to instead select the first, second, third, and fourth directional antennas 1114A, 1116A, 1114B, and 1116B, respectively, through which to radiate electromagnetic energy at the first frequency.

In additional embodiments, the metal frame 1102 has a top and a bottom, the first omnidirectional antenna 1110 and the second omnidirectional antenna 1111 are located in a first vertical plane, and the circuit board 1115 (e.g., a third printed circuit board) includes an extension portion 1115A (FIG. 12A) that extends above the top of the metal frame in one of the first vertical plane or a second vertical plane. The MRMC network device 1100 may further include the fifth and sixth omnidirectional antennas 1154A and 1154B (e.g., a pair of omnidirectional antennas) disposed on the extension portion 1115A of the circuit board 1115. A third radio 1150 may further be disposed on the circuit board 1115 and coupled to the fifth and sixth omnidirectional antennas 1154A and 1154B. The third radio 1150 may cause the fifth and sixth omnidirectional antennas 1154A and 1154B to radiate electromagnetic energy at a second frequency (e.g., 2.4 GHz, in one embodiment). Note that in an alternative embodiment, the extension portion 1115A may instead be a separate printed circuit board or other antenna carrier positioned above the metal frame 1102.

Figure 12C:
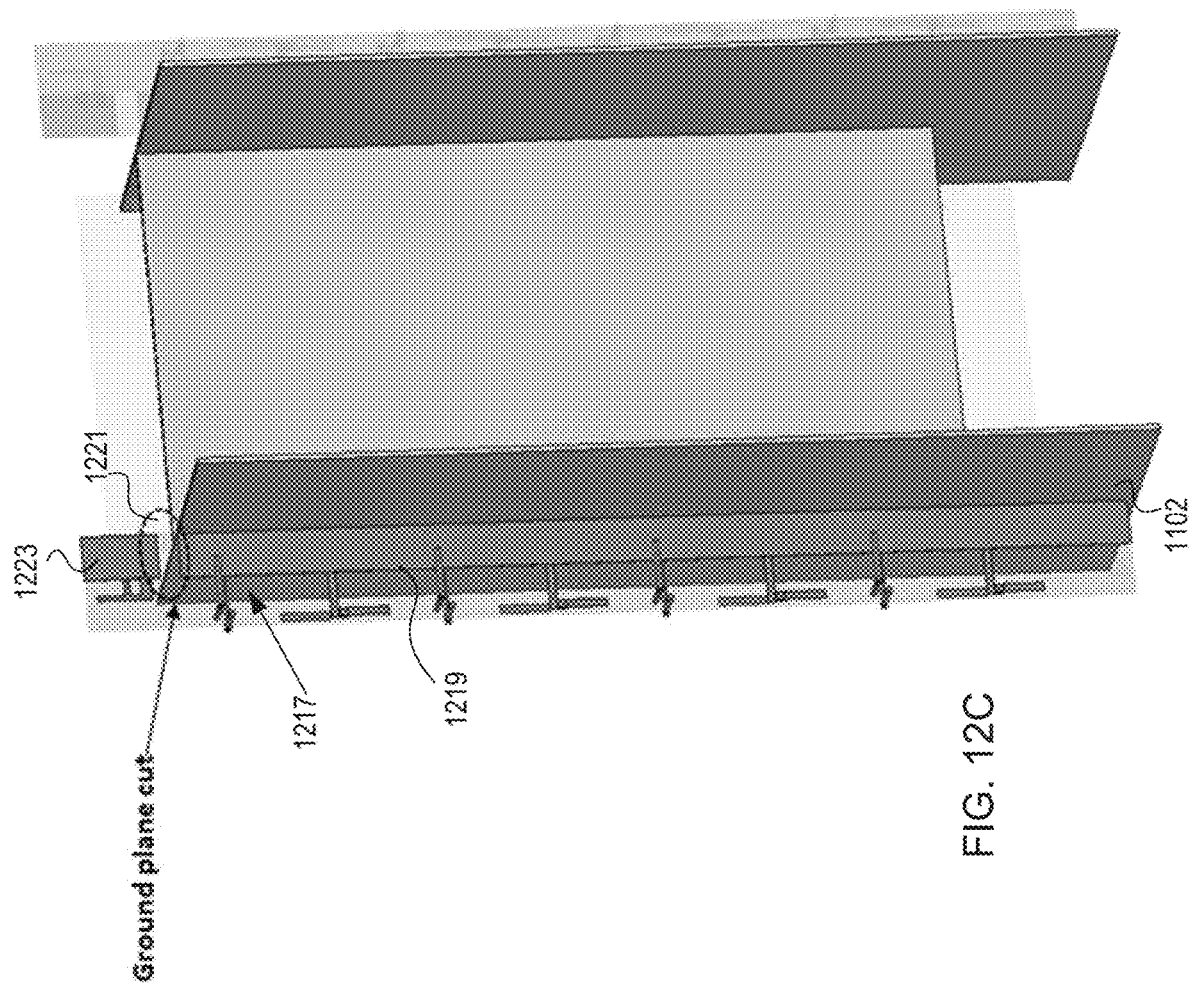
FIG. 12C is a side, perspective, cut-away view of a cut section of a ground plane of a directional antenna, according to an embodiment.

FIG. 12C is a side, perspective, cut-away view of a cut section 1221 of a ground plane 1217 of a directional antenna, according to an embodiment. In this embodiment, the first antenna carrier 1104 may include a main portion and an extension portion, the extension portion extending beyond the first end of the metal frame 1102. The first omnidirectional antenna 1110 may be disposed on the extension portion. The cut section 1221 may isolate a main ground plane 1219 disposed on the main portion of the antenna carrier 1104 from a ground plane extension 1223 disposed on the extension portion of the antenna carrier 1104, to isolate the first omnidirectional antenna 1110 from the first directional antenna 1114A and the second directional antenna 1116A.

Figure 13B:
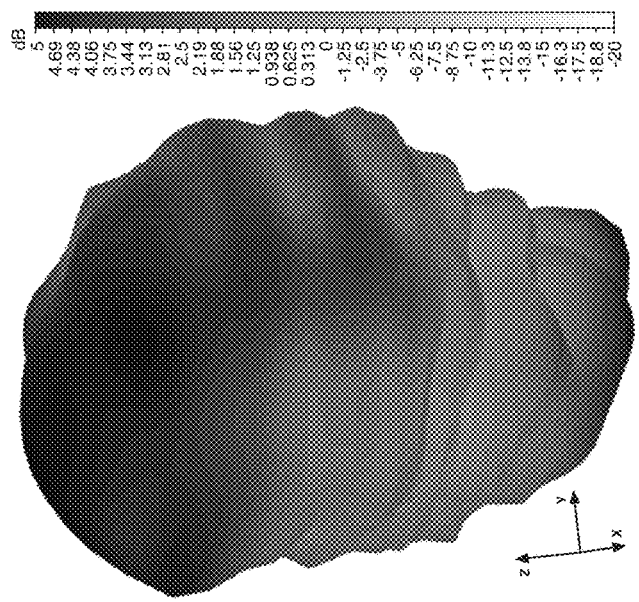
FIG. 13B is a radiation pattern of an omnidirectional antenna (OA1) of the MRMC network device of FIG. 11 radiating at a first frequency, according to an embodiment.
Figure 13C:
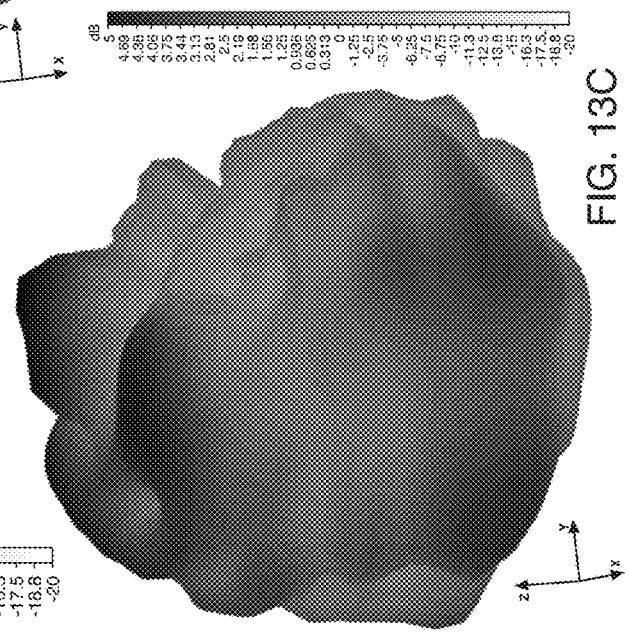
FIG. 13C is a radiation pattern of an omnidirectional antenna (OA3) of the MRMC network device of FIG. 11 radiating at the first frequency, according to an embodiment.
Figure 13A:
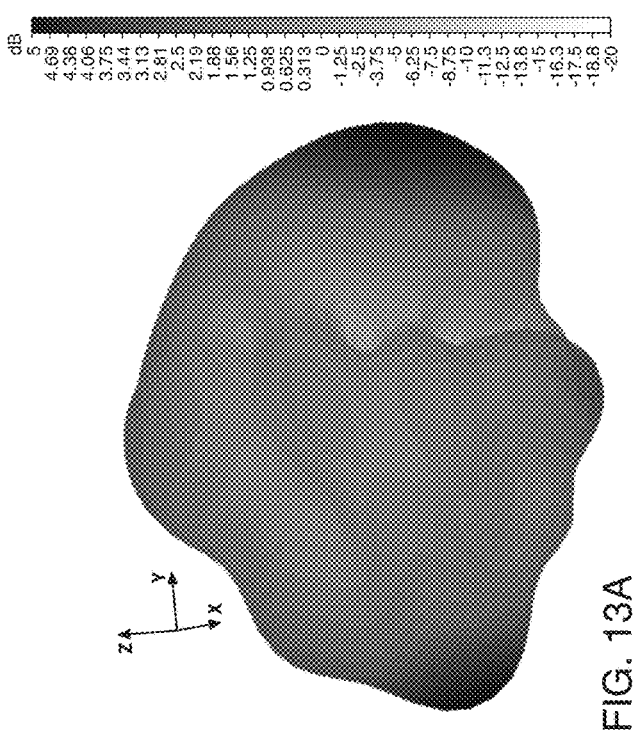
FIG. 13A is a radiation pattern of an omnidirectional antenna (OA5) of the MRMC network device of FIG. 11 radiating at a second frequency, according to an embodiment.

FIG. 13A is a radiation pattern of the omnidirectional antenna 1154A (OA5 at port 6 (P6)) of the MRMC network device 1100 of FIG. 11 radiating at a second frequency, according to an embodiment. FIG. 13B is a radiation pattern of the first omnidirectional antenna 1110 (OA1 at port 5 (P5)) of the MRMC network device 1100 of FIG. 11 radiating at a first frequency, according to an embodiment. FIG. 13C is a radiation pattern of the third omnidirectional antenna (OA3 at port 7 (P7)) of the MRMC network device 1100 of FIG. 11 radiating at the first frequency, according to an embodiment.

FIG. 14A is a graph illustrating isolation between omnidirectional antennas of the MRMC network device 1100 of FIG. 11 radiating at the first frequency, according to an embodiment. FIG. 14B is a graph illustrating isolation between directional antennas of the MRMC network device 1100 of FIG. 11, according to an embodiment. FIG. 14C is a graph illustrating isolation between antennas radiating at the first frequency and antennas radiating at the second frequency, according to an embodiment. Note that the port numbers (P numbers) illustrated in FIG. 11 correspond to the numbers within the legends of FIGS. 14A, 14B, and 14C. Based on a link budget analysis (e.g., that analyzes power levels at different circuit ports), antennas that are connected to the first radio 1120 should be isolated from antennas connected to the second radio 1130 by around 25 dB. Observe from FIG. 14A that this isolation requirement is satisfied. Furthermore, the isolation between the antennas that are to be radiated at the first frequency (F1) and antennas that are to be radiate at the second frequency (F2)

should be around 20 dB. Observe from FIG. 14B that this required isolation is also satisfied. FIG. 14C illustrates the isolation between the fifth omnidirectional antenna (P6), to be radiated at the second frequency, and the antennas to be radiated at the first frequency (e.g., at P1, P2, P3, P4, P5, P7, P9, and P10). The graph of FIG. 14C illustrates that the isolation between these antennas that are radiated at different frequencies is at least 20 dB, which meets the requirement.

In order to achieve the above isolations, the design was made to incorporate several parameters, including the physical distance between the antennas. In fact the distance between the antennas helps to reduce the intensity of the radiated fields generated from one antenna to another. Another factor is to control electric current on the ground plane. The electric current on the ground plane 1217 of the antenna board was controlled by cutting out the ground plane at particular locations (FIG. 12C) that helped to decrease the coupling between the antennas. Directions of the antennas were also designed to reduce the coupling between the antennas. In particular, the direction of the F portion of the PIFA antennas (at P5 and P9), illustrated in FIG. 12A, are toward the inner edge of the first and second printed circuit boards 1104 and 1108, respectively, to reduce the intensity of the PIFA-radiated fields at the directional antenna elements locations. The metal frame 1102 has been further located and sized to reduce the coupling between the directional antennas positioned on either side of the metal frame 1102. Indeed, the metal frame 1102 helps to form the directional patterns for the first, second, third, and fourth directional antennas 1114A, 1116A, 1114B, and 1116B, respectively, and simultaneously helps increase the isolation therebetween.

Figure 15:
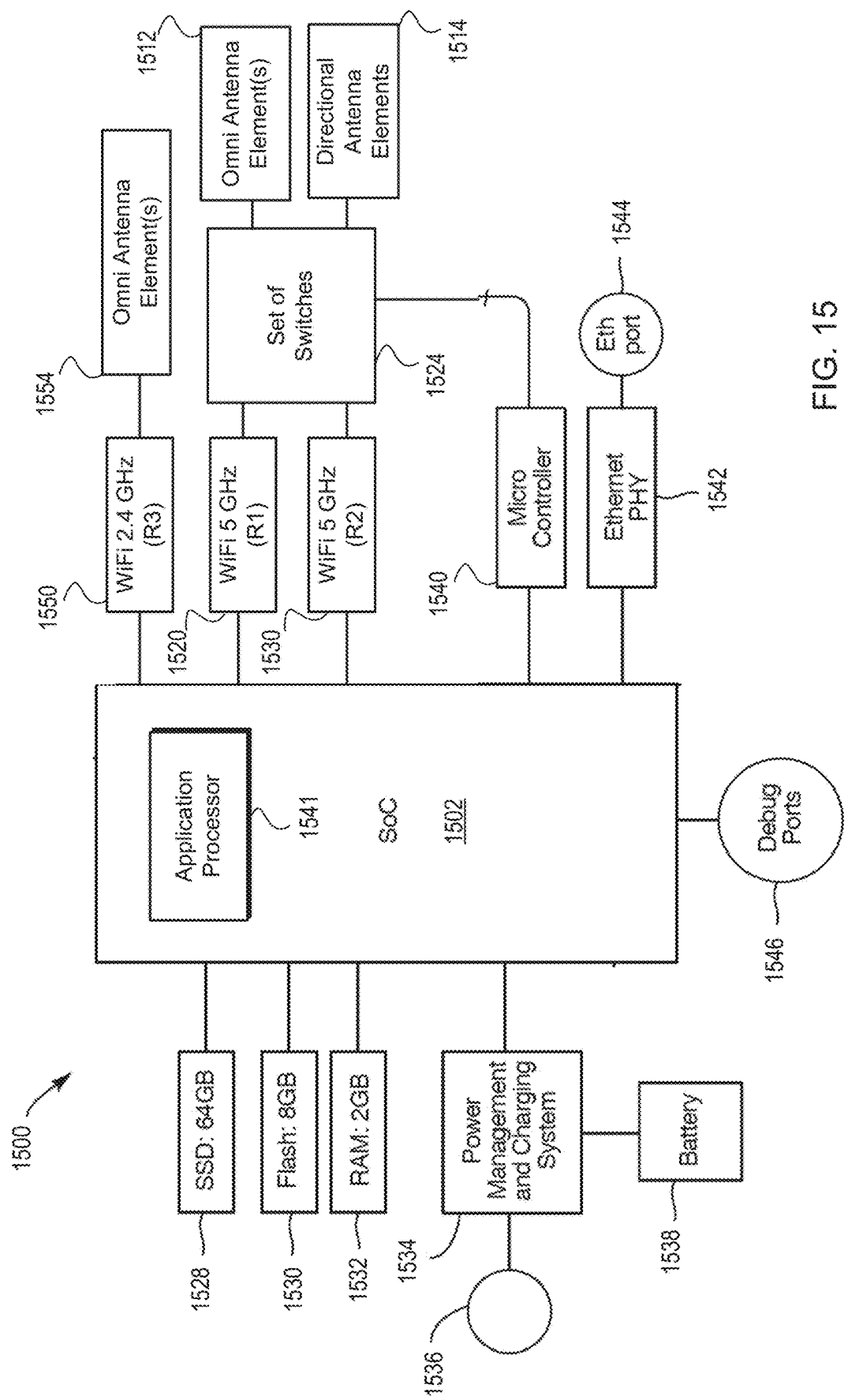
FIG. 15 is a block diagram of a mesh network device with an application processor, according to an embodiment.

FIG. 15 is a block diagram of a mesh network device 1500 with an application processor 1541, according to an embodiment. The mesh network device 1500 may be one of many mesh network devices organized in a wireless mesh network (WMN). The mesh network device 1500 is one of the nodes in a mesh topology in which the mesh network device 1500 cooperates with other mesh network devices in distribution of content files to client consumption devices in an environment of limited connectivity to broadband Internet infrastructure, as described herein. The mesh network device 1500 may be any one of the mesh network devices 100, 150, 1100 of FIGS. 1A, 1B, 2A-2G, 11, and 12A-12C.

The mesh network device 1500 includes a system on chip (SoC) 1502 to process data signals in connection with communicating with other mesh network devices and client consumption devices in the WMN. The SoC 1502 includes a processing element (e.g., a processor core, a central processing unit, or multiple cores) that processes the data signals and controls the radios to communicate with other devices in the WMN. In one embodiment, the SoC 1502 is a dual core SoC, such as the ARM A15 1.5 GHz with hardware network acceleration. The SoC 1502 may include memory and storage, such as 2 GB DDR RAM and 64 GB eMMC coupled to the SoC 1502 via external HDD interfaces (e.g., SATA, USB3, or the like).

The mesh network device 1500 may include a first wireless local area network (WLAN) 5 GHz radio 1520, a second WLAN 5 GHz radio 1530, and a WLAN 2.4 GHz radio 1550. In various embodiments, the SoC 1502 implements the application processor 1541 as processing logic including software, firmware, hardware, or any combination thereof. The SoC 1502 may include multiple RF interfaces, such as a first interface to the first WLAN 5 GHz radio 1520, a second interface to the second WLAN 5 GHz radio 1530, and a third interface to the WLAN 2.4 GHz radio 1550. The first and second interface may be combined as a single interface such as on a PCIe bus. In one embodiment, the SoC 1502 is the IPQ8064 Qualcomm SoC or the IPQ4029 Qualcomm SoC. Alternatively, other types of SoCs may be used, such as the Annapurna SoC, or the like. Alternatively, the mesh network device 1500 may include an application processor that is not necessarily considered to be a SoC.

The mesh network device 1500 may further include a set of omnidirectional antennas 1554 coupled to the WLAN 2.4 GHz radio 1550. The third interface to the SOC 1502 may provide radio frequency performance indicators (RFPIs) to the application processor 1541. The mesh network device 1500 may further include a set of omnidirectional antenna elements 1512 coupled to a set of switches 1524, which in turn are coupled to the first WLAN 5 GHz radio 1520 and the second WLAN 5 GHz radio 1530. Similarly, a set of directional antenna elements 1514 may be coupled to the set of switches 1524. The first interface and the second interface (or the single interface) may provide RFPIs from the first WLAN 5 GHz radio 1520 and the second WLAN 5 GHz radio 1530 to the application processor 1541.

In various embodiments, the application processor 1541 may then process the RFPI, e.g., according software code, algorithms, or other logic, to determine the best-performing RFPI or a group of RFPIs from the omnidirectional antenna elements 1512 and the directional antenna elements 1514. The best-performing RFPI or group of RFPIs may relate to a subset of antennas, to include a single antenna or a group of antennas, which may be associated with a channel within either of the first WLAN 5 GHz radio 1520 and the second WLAN 5 GHz radio 1530. A microcontroller 1540 may be coupled to the application processor 1541, which may in turn be coupled to the set of switches 1524. In embodiments, the application processor 1541 may signal the microcontroller 1540 (or otherwise trigger the microcontroller 1540) with an indication of transmit antenna(s) to be selected and transmit radio channel(s) to be selected. The microcontroller 1540 may then control the set of switches 1524 to select the transmit antenna(s) from the omnidirectional antenna elements 1512 and the directional antenna elements 1514, which are associated with the best-performing RFPI or group of RFPIs. Based on the transmit antenna(s), the microcontroller 1540 may then select the transmit radio(s) from the first WLAN 5 GHz radio 1520 and the second WLAN 5 GHz radio 1530 that are to radiate electromagnetic energy at 5 GHz from the transmit antenna(s). In one embodiment, the microcontroller 1540 may be combined into the application processor 1541, which may also perform the antenna and radio selection operations.

The mesh network device 1500 may also include memory and storage. For example, the mesh network device 1500 may include SSD 64 GB 1528, 8 GB Flash 1530, and 2 GB 1532. The memory and storage may be coupled to the SoC 1502 via one or more interfaces, such as USB 3.0, SATA, or SD interfaces. The mesh network device 1500 may also include a single Ethernet port 1544 that is an ingress port for Internet Protocol (IP) connection. The Ethernet port 1544 is connected to the Ethernet PHY 1542, which is connected to the SoC 1502. The Ethernet port 1544 may be used to service the mesh network device 1500. Although the Ethernet port 1544 could provide wired connections to client devices, the primary purpose of the Ethernet port 1544 is not to connect to client devices, since the 2.4 GHz connections are used to connect to clients in the WMN. The mesh network device 1500 may also include one or more debug ports 1546, which are coupled to the SoC 1502. The memory and storage may be used to cache content, as well as store software, firmware or other data for the mesh network device 1500.

The mesh network device 1500 may also include a power management and charging system 1534. The power management and charging system 1534 may be connected to a power supply 1536 (e.g., 240V outlet, 120V outlet, or the like). The power management and charging system 1534 may also connect to a battery 1538. The battery 1538 may provide power in the event of power loss. The power management and charging system 1534 may be configured to send a SoS message on power outage and backup system state. For example, the WLAN radios may be powered down, but the cellular radio may be powered by the battery 1538 to send the SoS message. The battery 1538 may provide limited operations by the mesh network device 1500, such as for 10 minutes before the entire system is completely powered down. In some cases, power outage will likely affect a geographic area in which the mesh network device 1500 is deployed (e.g., power outage that is a neighborhood wide phenomenon). The best option may be to power down the mesh network device 1500 and let the cloud service (e.g., back end service) know of the outage in the WMN. The power management and charging system 1534 may provide a 15V power supply up to 21 watts to the SoC 1502. Alternatively, the mesh network device 1500 may include more or less components to operate the multiple antennas as described herein.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
a metal frame having four vertical sides that form an inner chamber;
a first printed circuit board attached to an outside surface of a first vertical side of the four vertical sides;
a second printed circuit board attached to an outside surface of a second vertical side of the four vertical sides, the second vertical side being opposite from the first vertical side across the inner chamber;
a first omnidirectional antenna disposed on the first printed circuit board;
a first directional antenna disposed on the first printed circuit board;
a second omnidirectional antenna disposed on the second printed circuit board;
a second directional antenna disposed on the second printed circuit board;
a third printed circuit board disposed within the inner chamber of the metal frame;
no more than two radios, each operating at a first frequency, disposed on the third printed circuit board, the two radios comprising a first radio having a first channel estimator and a second radio having a second channel estimator;
a first switch disposed on the third printed circuit board and coupled to the first radio, wherein the first switch selectively couples one of the first omnidirectional antenna or the first directional antenna to the first radio;
a second switch disposed on the third printed circuit board and coupled to the second radio, wherein the second switch selectively couples one of the second omnidirectional antenna or the second directional antenna to the second radio;
an application processor disposed on the third printed circuit board and coupled to the first radio and to the second radio, wherein the application processor:
receives, from the first channel estimator, a first signal strength indicator (RSSI) value for signals received over the first omnidirectional antenna and a second RSSI value for signals received over the first directional antenna;
receives, from the second channel estimator, a third RSSI value for signals received over the second omnidirectional antenna and a fourth RSSI value for signals received over the second directional antenna; and
determines the first RSSI value is a highest RSSI value from among the first RSSI value, the second RSSI value, the third RSSI value, and the fourth RSSI value; and
a microcontroller operatively coupled to the application processor, the first switch, and the second switch, wherein the microcontroller:
controls the first switch to select the first omnidirectional antenna; and
selects the first radio, wherein the first omnidirectional antenna, in response to RF signals from the first radio, is to radiate electromagnetic energy at the first frequency.

2. The electronic device of claim 1, wherein the first directional antenna comprises a first array of vertical dipole elements to radiate with vertical polarization, the second directional antenna comprises a second array of vertical dipole elements to radiate with vertical polarization, and the electronic device further comprises:
a third omnidirectional antenna disposed on the first printed circuit board;
a third directional antenna disposed on the first printed circuit board, the third directional antenna comprising a first array of horizontal dipole elements to radiate with horizontal polarization;
a fourth omnidirectional antenna disposed on the second printed circuit board; and
a fourth directional antenna disposed on the second printed circuit board, the fourth directional antenna comprising a second array of horizontal dipole elements to radiate with horizontal polarization;
a third switch disposed on the third printed circuit board and coupled to the first radio, wherein the third switch selectively couples one of the third omnidirectional antenna or the third directional antenna to the first radio; and
a fourth switch disposed on the third printed circuit board and coupled to the second radio, wherein the fourth switch selectively couples one of the fourth omnidirectional antenna or the fourth directional antenna to the second radio;
wherein the application processor:
receives, from the first channel estimator, a fifth RSSI value for signals received over the third omnidirectional antenna and a sixth RSSI value for signals received over the third directional antenna;
receives, from the second channel estimator, a seventh RSSI value for signals received over the fourth omnidirectional antenna and an eighth RSSI value for signals received the fourth directional antenna; and
determines that an addition of the first RSSI value, third RSSI value, fifth RSSI value, and seventh RSSI value is higher than an addition of the second RSSI value, fourth RSSI value, sixth RSSI value, and eight RSSI value; and
wherein the microcontroller is further coupled to the third switch and the fourth switch.

3. The electronic device of claim 1, wherein the metal frame has a first end and a second end, the third printed circuit board comprises an extension portion that extends beyond the first end of the metal frame, and wherein the electronic device further comprises:
a pair of third omnidirectional antennas disposed on the extension portion; and
a third radio disposed on the third printed circuit board and coupled to the pair of third omnidirectional antennas, the third radio to cause the pair of third omnidirectional antennas to radiate electromagnetic energy at a second frequency.

4. The electronic device of claim 1, wherein the metal frame has a first end and a second end, the first printed circuit board comprises a first extension portion, which extends beyond the first end of the metal frame, on which is disposed the first omnidirectional antenna, and wherein the second printed circuit board comprises a second extension portion, which extends beyond the first end of the metal frame, on which is disposed the second omnidirectional antenna.

5. An electronic device comprising:
a metal frame having a first end and a second end between which is defined a longitudinal axis of the metal frame;
a first printed circuit board attached to an outside surface of a first side of the metal frame, wherein a height of the first printed circuit board is greater than half of a height of the metal frame along the longitudinal axis;
a first directional antenna disposed on the first printed circuit board;
a second printed circuit board attached to an outside surface of a second side of the metal frame, wherein a height of the second printed circuit board is greater than half of the height of the metal frame along the longitudinal axis;
a second directional antenna disposed on the second printed circuit board, wherein the first directional antenna and the second directional antenna are oriented in parallel and separated by a first distance;
an omnidirectional antenna disposed on a third printed circuit board oriented perpendicular to sides of the metal frame and attached to the first end of the metal frame;
a first radio;
a switch coupled to the first radio, wherein the switch selectively couples one of the omnidirectional antenna or the first directional antenna to the first radio;
a second radio coupled to the second directional antenna; and
an application processor coupled to the first radio, to the second radio, and to the switch.

6. The electronic device of claim 5, wherein the third printed circuit board is disposed over one of the first printed circuit board or the second printed circuit board, and wherein the omnidirectional antenna comprises a dipole element.

7. The electronic device of claim 5, wherein the metal frame has a plurality of sides between the first end and the second end, and wherein the third circuit board is attached to a corner formed between one of the first side or the second side and a third side connecting the first side and the second side of the metal frame, and wherein the omnidirectional antenna comprises a monopole element.

8. The electronic device of claim 5, wherein the first directional antenna comprises:
   a first array of horizontal dipole elements, disposed on a first surface of the first printed circuit board, to radiate electromagnetic energy with horizontal polarization in a first direction;
   a first array of vertical dipole elements disposed on the first surface of the first printed circuit board to radiate electromagnetic energy with vertical polarization, wherein a first vertical dipole element of the first array of vertical dipole elements is interspersed between two of the first array of horizontal dipole elements, to radiate the electromagnetic energy with cross-polarization in the first direction;
   a second array of horizontal dipole elements, disposed on a second surface of the first printed circuit board, to radiate electromagnetic energy with horizontal polarization in a second direction opposite the first direction; and
   a second array of vertical dipole elements disposed on the second surface of the first printed circuit board to radiate electromagnetic energy with vertical polarization, wherein a first vertical dipole element of the second array of vertical dipole elements are interspersed between two of the second array of horizontal dipole elements, to radiate the electromagnetic energy with cross-polarization in the second direction.

9. An apparatus comprising:
   a metal frame having a first end, a second end, and a plurality of sides oriented between the first end and the second end to form an inner chamber;
   a first antenna carrier attached to an outside surface of a first side of the plurality of sides, the first antenna carrier comprising a first extension portion that extends beyond the metal frame at the first end of the metal frame;
   a second antenna carrier attached to an outside surface of a second side of the plurality of sides and separated from the first antenna carrier by a first distance, the second antenna carrier comprising a second extension portion that extends beyond the metal frame at the first end of the metal frame;
   a first omnidirectional antenna disposed on the first extension portion;
   a first directional antenna disposed on the first antenna carrier below the first omnidirectional antenna;
   a second omnidirectional antenna disposed on the second extension portion;
   a second directional antenna disposed on the second antenna carrier below the second omnidirectional antenna;
   a circuit board disposed within the inner chamber;
   a first radio disposed on the circuit board and selectively coupled to the first omnidirectional antenna and the first directional antenna, wherein the first radio is to cause one of the first omnidirectional antenna or the first directional antenna to radiate electromagnetic energy at a first frequency depending on a strength of radio frequency performance indicator (RFPI) values for signals received over a combination of the first omnidirectional antenna and the second omnidirectional antenna compared to RFPI values for signals received over the first directional antenna; and
   a second radio disposed on the circuit board and selectively coupled to the second omnidirectional antenna and the second directional antenna, wherein the second radio is to cause one of the second omnidirectional antenna or the second directional antenna to radiate electromagnetic energy at the first frequency depending on a strength of RFPI values for signals received over a combination of the first omnidirectional antenna and the second omnidirectional antenna compared to RFPI values for signals received over the second directional antenna.

10. The apparatus of claim 9, wherein the first directional antenna comprises a first array of vertical dipole elements to radiate with vertical polarization and a first array of horizontal dipole elements to radiate with horizontal polarization, and wherein the second directional antenna comprises a second array of vertical dipole elements to radiate with vertical polarization and a second array of horizontal dipole elements to radiate with horizontal polarization, the apparatus further comprising:
   a third omnidirectional antenna disposed at a second end of the first antenna carrier and coupled to the first radio;
   a fourth omnidirectional antenna disposed at a second end of the second antenna carrier and coupled to the second radio;
   a first switch coupled to the first radio, wherein the first switch selectively couples one of the first omnidirectional antenna or the first array of vertical dipole elements to the first radio;
   a second switch coupled to the first radio, wherein the second switch selectively couples one of the third omnidirectional antenna or the first array of horizontal dipole elements to the first radio;
   a third switch coupled to the second radio, wherein the third switch selectively couples one of the second omnidirectional antenna or the second array of vertical dipole elements to the second radio; and
   a fourth switch coupled to the second radio, wherein the fourth switch selectively couples one of the fourth omnidirectional antenna or the second array of horizontal dipole elements to the second radio.

11. The apparatus of claim 10, wherein at least one of the third omnidirectional antenna or the fourth omnidirectional antenna is a triangular monopole antenna.

12. The apparatus of claim 10, wherein the first radio is to estimate a first RFPI value for signals received over the first omnidirectional antenna, a second RFPI value for signals received over the third omnidirectional antenna, and a third RFPI value for signals received over the first directional antenna, the apparatus further comprising:
   an application processor disposed on the circuit board and operatively coupled to the first radio, to the first switch, and to the second switch, wherein the application processor is to:
      receive, from the first radio, the first RFPI value, the second RFPI value, and the third RFPI value;
      add the first RFPI value and the second RFPI value to generate a fourth RFPI value;
      determine whether third RFPI value or the fourth RFPI value is best; and
      perform one of:
         control the first switch and the second switch to select the first omnidirectional antenna and the third omnidirectional antenna, respectively; or control the first switch and the second switch to select the first array of vertical dipole elements and the first array of horizontal dipole elements, respectively.

13. The apparatus of claim 10, wherein the second radio is to estimate a first RFPI value for signals received over the second omnidirectional antenna, a second RFPI value for signals received over the fourth omnidirectional antenna, and a third RFPI value for signals received over the second directional antenna, the apparatus further comprising:
an application processor disposed on the circuit board and operatively coupled to the to the second radio, to the third switch, and to the fourth switch, wherein the application processor is to:
receive, from the second radio, the first RFPI value, the second RFPI value, and the third RFPI value;
add the first RFPI value and the second RFPI value to generate a fourth RFPI value;
determine whether the third RFPI value or the fourth RFPI value is best; and
perform one of:
control the third switch and the fourth switch to select the second omnidirectional antenna and the fourth omnidirectional antenna, respectively; or
control the third switch and the fourth switch to select the second array of vertical dipole elements and the second array of horizontal dipole elements, respectively.

14. The apparatus of claim 9, wherein at least one of the first omnidirectional antenna or the second omnidirectional antenna comprises an inverted F antenna, and wherein a first F portion of the first omnidirectional antenna is oriented towards a second F portion of the second omnidirectional antenna.

15. The apparatus of claim 9, wherein the first antenna carrier comprises a main portion that lies below the first extension portion along the first side of the metal frame, and wherein a ground plane of the first antenna carrier includes a cut section between a main ground plane disposed on the main portion and a ground plane extension disposed on the first extension portion, to isolate the first omnidirectional antenna from the first directional antenna.

16. The electronic device of claim 5, wherein the application processor is to:
receive, from the first radio, a first radio frequency performance indicator (RFPI) value associated with signals received over the omnidirectional antenna and a second RFPI value associated with signals received over the first directional antenna;
receive from the second radio, a third RFPI value associated with signals received over the second directional antenna;
determine a best RFPI value from the first RFPI value, the second RFPI value, and the third RFPI value;
select an antenna that receives signals corresponding to the best RFPI value from the first directional antenna, the second directional antenna, and the omnidirectional antenna; and
select a radio from the first radio and the second radio that is coupled to the antenna, wherein the antenna, in response to signals from the radio, is to radiate electromagnetic energy at a first frequency.

17. The electronic device of claim 16, wherein one of the first RFPI value, second RFPI value, or third RFPI value comprises at least one of received signal strength indicator (RSSI), interference level, throughput, or a bit error rate.

18. The electronic device of claim 16, wherein to select the antenna and the radio, the application processor is to one of:
select the first radio and control the switch to selectively couple the first directional antenna to the first radio;
select the first radio and control the switch to select the omnidirectional antenna; or
select the second radio to transmit over the second directional antenna.

19. The electronic device of claim 16, wherein the switch is a first switch, the electronic device further comprising a second switch coupled to the second radio, wherein the second switch selectively couples one of the omnidirectional antenna or the second directional antenna to the second radio, wherein the application processor is further to:
receive, from the second radio, a fourth RFPI value for signals received over the omnidirectional antenna;
determine which of the first RFPI value, the second RFPI value, the third RFPI value, and the fourth RFPI value is the best RFPI value; and
wherein to select the antenna and the radio, the application processor is to one of:
select the first radio and control the first switch to selectively couple the first directional antenna to the first radio;
select the second radio and control the second switch to selectively couple the second directional antenna to the second radio;
select the first radio and control the first switch to selectively couple the omnidirectional antenna to the first radio; or
select the second radio and control the second switch to selectively coupled the omnidirectional antenna to the second radio.

20. The electronic device of claim 16, wherein the application processor is further to, at a first time:
determine a first best RFPI value from the first RFPI value, the second RFPI value, and the third RFPI value received;
select a first transmit antenna that receives signals corresponding to the first best RFPI value from the first directional antenna, the second directional antenna, and the omnidirectional antenna; and
select a first transmit radio from the first radio and the second radio that is coupled to the first transmit antenna, wherein the first transmit antenna, in response to signals from the first transmit radio, is to radiate electromagnetic energy at a first frequency; and
wherein the application processor is further to, at a second time:
determine a second best RFPI value from the first RFPI value, the second RFPI value, and the third RFPI value received;
select a second transmit antenna that receives signals corresponding to the second best RFPI value from the first directional antenna, the second directional antenna, and the omnidirectional antenna; and
select a second transmit radio from the first radio and the second radio that is coupled to the first transmit antenna, wherein the second transmit antenna, in response to signals from the second transmit radio, is to radiate electromagnetic energy at the first frequency.

* * * * *